US010743964B2

(12) United States Patent
Wu et al.

(10) Patent No.: US 10,743,964 B2
(45) Date of Patent: Aug. 18, 2020

(54) DUAL ALIGNER ASSEMBLY

(71) Applicant: Align Technology, Inc, San Jose, CA (US)

(72) Inventors: Fuming Wu, Pleasanton, CA (US); Jihua Cheng, San Jose, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/202,384

(22) Filed: Jul. 5, 2016

(65) Prior Publication Data

US 2017/0007364 A1 Jan. 12, 2017

Related U.S. Application Data

(60) Provisional application No. 62/189,384, filed on Jul. 7, 2015.

(51) Int. Cl.
*A61C 7/08* (2006.01)
(52) U.S. Cl.
CPC ..................... *A61C 7/08* (2013.01)
(58) Field of Classification Search
CPC ............... A61C 7/06; A61C 7/08; A61C 7/10
USPC .............................................................. 433/6
See application file for complete search history.

(56) References Cited

U.S. PATENT DOCUMENTS

| 2,467,432 | A | 4/1949 | Kesling |
| 2,479,780 | A | 8/1949 | Orrin et al. |
| 2,682,870 | A | 7/1954 | Fredrickson et al. |
| 3,407,500 | A | 10/1968 | Kesling |
| 3,600,808 | A | 8/1971 | James |
| 3,660,900 | A | 5/1972 | Lawrence |

(Continued)

FOREIGN PATENT DOCUMENTS

| AU | 3031677 A | 5/1979 |
| AU | 517102 B2 | 7/1981 |

(Continued)

OTHER PUBLICATIONS

ISA/EP, International Search Report and Written Opinion for International Application # PCT/IB2016/000976, pp. 1-13, dated Oct. 4, 2016 (Oct. 4, 2016).

(Continued)

*Primary Examiner* — Edward Moran
(74) *Attorney, Agent, or Firm* — Wilson Sonsini Goodrich & Rosati

(57) ABSTRACT

A dual aligner assembly including a plurality of aligners, including a first aligner and a second aligner. The first aligner has a first shape corresponding to a set of target tooth positions and applies an orthodontic force against a set of target teeth. The first orthodontic force generates movement of the set of target teeth to the set of target tooth positions. The second aligner has a second shape corresponding to a combination of current tooth positions of the set of target teeth, the set of target tooth positions, and a thickness of the first aligner. The second aligner partially encloses the first aligner and provides an anchor for at least a portion of the first aligner. Via the anchor, a combination of the first aligner and the second aligner provides an orthodontic force that prevents the set of target teeth from moving to unwanted tooth positions during orthodontic treatment.

17 Claims, 9 Drawing Sheets

(56) References Cited

U.S. PATENT DOCUMENTS

| | | |
|---|---|---|
| 3,683,502 A | 8/1972 | Melvin |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,975,825 A | 8/1976 | Smith |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,551,096 A | 11/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A * | 7/1988 | Abbatte .................. A61C 7/08 433/6 |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A * | 10/1991 | Abbatte .................. A61C 7/08 433/24 |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,203,700 A | 4/1993 | Chmel |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren |
| 6,244,861 B1 | 6/2001 | Andreiko et al. |
| 6,293,790 B1 | 9/2001 | Hilliard |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,398,548 B1 | 6/2002 | Muhammad et al. |
| 6,402,707 B1 | 6/2002 | Ernst |
| 6,450,807 B1 | 9/2002 | Chishti et al. |
| 6,471,511 B1 | 10/2002 | Chishti et al. |
| 6,482,298 B1 | 11/2002 | Bhatnagar |
| 6,524,101 B1 * | 2/2003 | Phan ..................... A61C 7/00 433/24 |
| 6,554,611 B2 | 4/2003 | Chishti et al. |
| 6,572,372 B1 | 6/2003 | Phan et al. |
| 6,607,382 B1 | 8/2003 | Kuo et al. |

(56) References Cited

U.S. PATENT DOCUMENTS

| | | |
|---|---|---|
| 6,629,840 B2 | 10/2003 | Chishti et al. |
| 6,705,863 B2 | 3/2004 | Phan et al. |
| 6,722,880 B2 | 4/2004 | Chishti et al. |
| 6,749,414 B1 | 6/2004 | Hanson et al. |
| 6,830,450 B2 | 12/2004 | Knopp et al. |
| 7,553,157 B2 | 6/2009 | Abolfathi et al. |
| 7,819,661 B2 | 10/2010 | Nadav |
| 7,878,801 B2 | 2/2011 | Abolfathi et al. |
| 7,883,334 B2 | 2/2011 | Li et al. |
| 7,892,474 B2 | 2/2011 | Shkolnik et al. |
| 8,235,713 B2 | 8/2012 | Phan et al. |
| 8,348,665 B2 | 1/2013 | Kuo |
| 8,439,672 B2 | 5/2013 | Matov et al. |
| 8,439,674 B2 | 5/2013 | Li et al. |
| 8,444,412 B2 | 5/2013 | Baughman et al. |
| 8,708,697 B2 | 4/2014 | Li et al. |
| 8,758,009 B2 | 6/2014 | Chen et al. |
| 8,899,976 B2 | 12/2014 | Chen et al. |
| 9,655,691 B2 | 5/2017 | Li et al. |
| 2002/0006597 A1 | 1/2002 | Andreiko et al. |
| 2002/0192617 A1 | 12/2002 | Phan et al. |
| 2003/0009252 A1 | 1/2003 | Pavlovskaia et al. |
| 2003/0139834 A1 | 7/2003 | Nikolskiy et al. |
| 2003/0224311 A1 | 12/2003 | Cronauer |
| 2004/0128010 A1 | 7/2004 | Pavlovskaia et al. |
| 2004/0209218 A1 | 10/2004 | Chishti et al. |
| 2004/0219473 A1 | 11/2004 | Cleary et al. |
| 2005/0055118 A1 | 3/2005 | Nikolskiy et al. |
| 2006/0008760 A1 | 1/2006 | Phan et al. |
| 2006/0188834 A1* | 8/2006 | Hilliard .............. A61C 7/02 433/24 |
| 2007/0031775 A1 | 2/2007 | Andreiko et al. |
| 2007/0065768 A1* | 3/2007 | Nadav ............... A61C 7/006 433/6 |
| 2007/0087302 A1 | 4/2007 | Reising et al. |
| 2007/0207434 A1 | 9/2007 | Kuo et al. |
| 2007/0292821 A1 | 12/2007 | De |
| 2008/0268400 A1 | 10/2008 | Moss et al. |
| 2009/0061375 A1 | 3/2009 | Yamamoto et al. |
| 2009/0061379 A1 | 3/2009 | Yamamoto et al. |
| 2009/0191502 A1 | 7/2009 | Cao et al. |
| 2009/0220921 A1 | 9/2009 | Abolfathi et al. |
| 2010/0055635 A1 | 3/2010 | Kakavand et al. |
| 2010/0092905 A1 | 4/2010 | Martin |
| 2010/0129762 A1* | 5/2010 | Mason ............... A61C 7/002 433/6 |
| 2010/0129763 A1* | 5/2010 | Kuo .................. A61C 7/08 433/6 |
| 2010/0138025 A1 | 6/2010 | Morton et al. |
| 2010/0239992 A1 | 9/2010 | Brandt et al. |
| 2010/0285419 A1 | 11/2010 | Cinader, Jr. et al. |
| 2011/0007920 A1 | 1/2011 | Abolfathi et al. |
| 2011/0020761 A1 | 1/2011 | Kalili |
| 2011/0136072 A1* | 6/2011 | Li ..................... A61C 7/08 433/18 |
| 2011/0244413 A1 | 10/2011 | Teasdale |
| 2011/0281229 A1 | 11/2011 | Abolfathi |
| 2012/0148971 A1* | 6/2012 | Yamamoto ......... A61C 7/00 433/6 |
| 2013/0029285 A1 | 1/2013 | Teasdale |
| 2013/0095446 A1 | 4/2013 | Andreiko et al. |
| 2013/0302742 A1* | 11/2013 | Li ..................... A61C 7/08 433/6 |
| 2014/0061974 A1 | 3/2014 | Tyler et al. |
| 2014/0193767 A1 | 7/2014 | Li et al. |
| 2014/0265034 A1 | 9/2014 | Dudley |
| 2014/0370452 A1 | 12/2014 | Tseng |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0366637 A1* | 12/2015 | Kopelman ......... A61C 7/08 433/6 |
| 2015/0366638 A1 | 12/2015 | Kopelman et al. |
| 2016/0081768 A1 | 3/2016 | Kopelman et al. |
| 2016/0157961 A1 | 6/2016 | Lee |
| 2016/0278899 A1* | 9/2016 | Heller ............... A61K 9/0004 |
| 2017/0007361 A1 | 1/2017 | Boronkay et al. |
| 2017/0007368 A1 | 1/2017 | Boronkay |

FOREIGN PATENT DOCUMENTS

| | | |
|---|---|---|
| AU | 5598894 A | 6/1994 |
| CA | 1121955 A | 4/1982 |
| CN | 104093375 A | 10/2014 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 3/1996 |
| JP | 2013123624 A | 6/2013 |
| JP | 2013123626 A | 6/2013 |
| KR | 200465679 Y1 | 3/2013 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | 0180764 A1 | 11/2001 |
| WO | 2009118601 A2 | 10/2009 |
| WO | WO-2017007962 A1 | 1/2017 |

OTHER PUBLICATIONS

ISA/EP, International Search Report and Written Opinion for International Application # PCT/US2016/041383, pp. 1-19, dated Nov. 28, 2016 (Nov. 28, 2016).

AADR. American Association for Dental Research, Summary of Activities, Mar. 20-23, 1980, Los Angeles, CA, p. 195.

Alcaniz, et aL, "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures, " IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

(56) References Cited

OTHER PUBLICATIONS

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Operation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/—pbourke/prolection/coords>.
Boyd et al., "Three Dimensional Diagnosis and Orthodontic Treatment of Complex Malocclusions With the lnvisalipn Appliance," Semin. Orthod., 7(4):274-293 (Dec. 2001).
Brandestini et al., "Computer Machined Ceramic Inlays: in Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form in Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Carbon3D. CLIP Technology. A new approach to 3D printing. 2015. http://carbon3d.com/ Accessed Jul. 1, 2015.
Cardinal Industrial Finishes, Powder Coatings information posted at<http://www.cardinalpaint.com> on Aug. 25, 2000, 2 pages.
Carnaghan, "An Alternative to Holograms for the Portrayal of Human Teeth," 4th Int'l. Conf. On Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Composite material. Wikipedia. Last modified Jun. 22, 2015. https://en.wikipedia.org/wiki/Composite_material.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992).
Definition for gingiva. Dictionary.com p. 1-3. Retrieved from the internet Nov. 5, 2004<http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
Dent-X posted on Sep. 25, 1998 at< http://www.dent-x.com/DentSim.htm>, 6 pages.
Desimone. What if 3D printing was 100% faster? TEDtalk. Mar. 2015. http://www.ted.com/talks/joe_desimone_what_if_3d_printing_was_25x_faster.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al, "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet<http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
GIM-ALLDENT Deutschland, "Das DUX System: Die Technik," 2 pages total (2002).

(56) References Cited

OTHER PUBLICATIONS

Gottleib et al., "JCO Interviews Dr. James A. McNamura, Jr., on the Frankel Appliance: Part 2: Clinical 1-1 Management," J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates in Orthodontics and Orthognathic Surgery," JCO, pp. 262-28 (Apr. 1989).
Halterman. A path to the future—continuous composite 3D printing. Nov. 12, 2014. http://www.3dprinterworld.com/article/path-future-continuous-composite-3d-printing.
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hipolite. Helios One 3D Printer—New Heliolithography Technology Could Eventually Replace SLA and FDM. Jul. 2, 2014. http://3dprint.com/7958/orange-maker-helio-one-3d/.
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances—Pro Lab, 1 page 1998).
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports on Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984). KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991).
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Objet Geometries. Wikipedia. Last modified Jul. 17, 2014. https://en.wikipedia.org/wiki/Objet_Geometries.
Orange Maker. High resolution 3D printing technology. 2015. http://www.orangemaker.com/. Accessed Jul. 1, 2015.
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
PROCERA Research Projects, "PROCERA Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances,< http:// www.essix.com/magazine/defaulthtml> Aug. 13, 1997.
Rapid prototyping. Protosys Technologies. 2005. http://www.protosystech.com/rapid-prototyping.htm. Accessed Jul. 1, 2015.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).

(56) References Cited

OTHER PUBLICATIONS

Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording the Dental Cast in Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No-Braces Treatment, Allesee HJ Orthodontic Appliances—Pro Lab product information for patients,< http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances—Pro Lab product information, 6 pages (2003).
The Orange Maker Spins the Plate to Make Better 3D Prints. Newloop Tech and Gadgets. YouTube. Jul. 11, 2014. https://www.youtube.com/watch?v=MpzPWURWfZk.
The Red, White & Blue Way to Improve Your Smile! Allesee Orthodontic Appliances—Pro Lab product information for patients, 2 pages 1992.
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20,1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993).
Varady et al., "Reverse Engineering of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).

(56) References Cited

OTHER PUBLICATIONS

You May Be a Candidate for This Invisible No-Braces Treatment, Allesee Orthodontic Appliances—Pro Lab product information for patients, 2 pages (2002).

\* cited by examiner

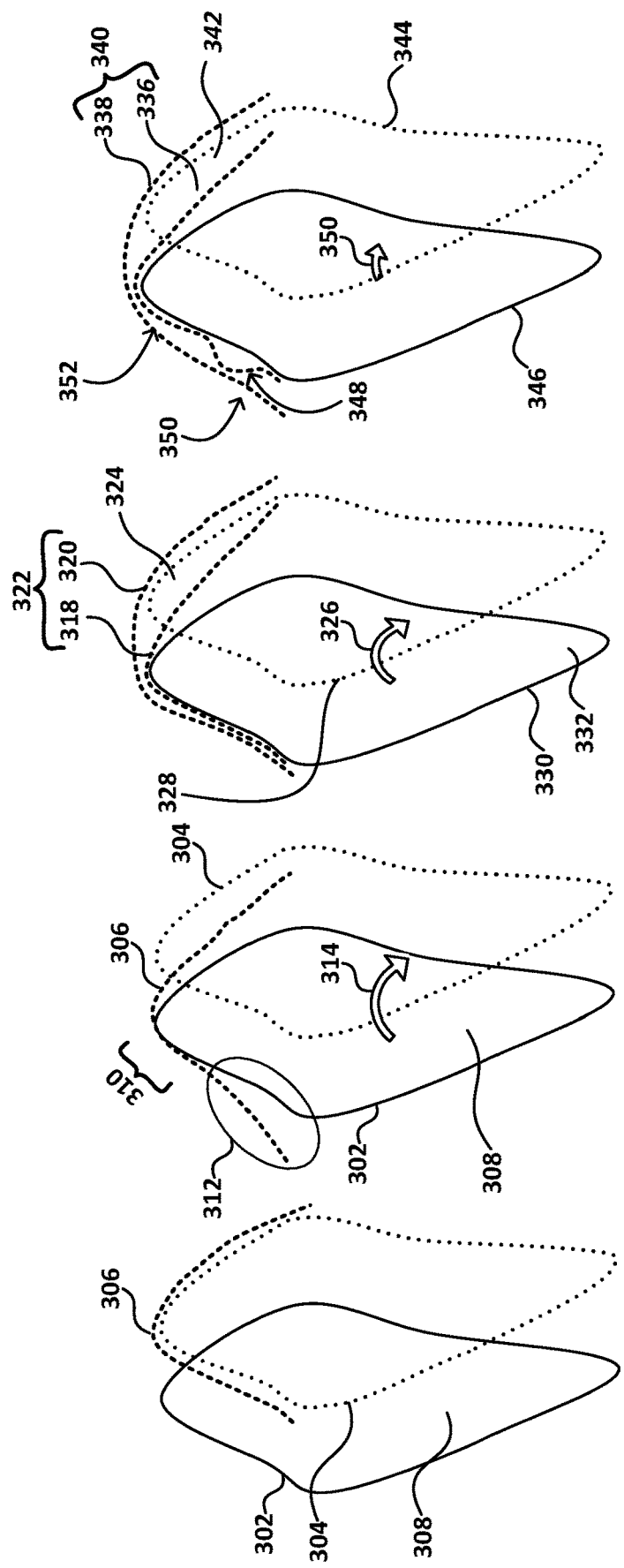

DUAL ALIGNER ASSEMBLY

RELATED APPLICATIONS

This application claims priority to and benefit of U.S. Patent Application No. 62/189,384 filed on Jul. 7, 2015 entitled "DUAL ALIGNER ASSEMBLY" by Wu et al., and assigned to the assignee of the present application.

The subject matter of the following patent applications is related to the present application: U.S. application Ser. No. 15/202,342, filed Jul. 5, 2016, entitled "MULTI-MATERIAL ALIGNERS", which claims the benefit of U.S. Provisional Application No. 62/189,259, filed Jul. 7, 2015, and U.S. Provisional Application No. 62/189,282, filed Jul. 7, 2015.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

This invention relates in general to a system of repositioning teeth for use in orthodontic treatment. More particularly, this invention relates to the use of orthodontic appliances for producing tooth movements.

BACKGROUND

Orthodontic treatments involve repositioning misaligned teeth and improving bite configurations for improved cosmetic appearance and dental function. Repositioning teeth is accomplished by applying controlled forces to the teeth over an extended period of time. This is conventionally accomplished by wearing what are commonly referred to as "braces". Braces comprise a variety of appliances such as brackets, bands, archwires, ligatures, and O-rings. After they are bonded to the teeth, periodic meetings with the orthodontist are required to adjust the braces. This involves installing different archwires having different force-inducing properties or by replacing or tightening existing ligatures. Between meetings, the patient may be required to wear supplementary appliances, such as elastic bands or headgear, to supply additional or extraoral forces.

Although conventional braces are effective, they are often a tedious and time consuming process requiring many visits to the orthodontist's office. Moreover, from a patient's perspective, they are unsightly and uncomfortable. Consequently, alternative orthodontic treatments have been developed. A particularly promising approach relies on the use of elastic positioning appliances for realigning teeth. Such appliances comprise a thin shell of elastic material that generally conforms to a patient's teeth but is slightly out of alignment with the initial tooth configuration. Placement of the elastic positioner over the teeth applies controlled forces in specific locations to gradually move the teeth into the new configuration. Repetition of this process with successive appliances comprising new configurations eventually moves the teeth through a series of intermediate configurations to a final desired configuration. A full description of an exemplary elastic polymeric positioning appliance is described in U.S. Pat. No. 5,975,873, assigned to the assignee of the present invention, and incorporated by reference for all purposes.

In addition to their ease of use, polymeric positioning appliances are generally transparent, providing an improved cosmetic appearance, and impart substantial force on the teeth, due to stiffness of the appliance. Each aligner shell has an inner shape that is configured to move the patient's teeth to the next planned position. However, when a patient's teeth do not follow this planned movement by not moving or moving in an unplanned direction, a "lag of movement" occurs. When this lag of movement becomes too great, that is, when the difference between the current position of the patient's teeth and the planned position at which the aligner is to move the teeth becomes too great, in many cases, the aligner is no longer able to be snapped onto the patient's teeth. Accordingly, improved appliances and techniques are needed to reduce this lag in movement during orthodontic treatment, and to reduce unwanted tooth movements.

BRIEF DESCRIPTION OF THE DRAWINGS

Aspects of the present invention are illustrated by way of example, and not by way of limitation, in the accompanying drawings, wherein:

FIG. 3A illustrates aligner action using a conventional aligner.

FIG. 3B illustrates aligner action using a conventional aligner.

FIG. 3C illustrates a dual aligner assembly snapped onto the patient's teeth, in accordance with an embodiment.

FIG. 3D illustrates a dual aligner assembly snapped onto the patient's teeth, in accordance with an embodiment.

Figure 1A:
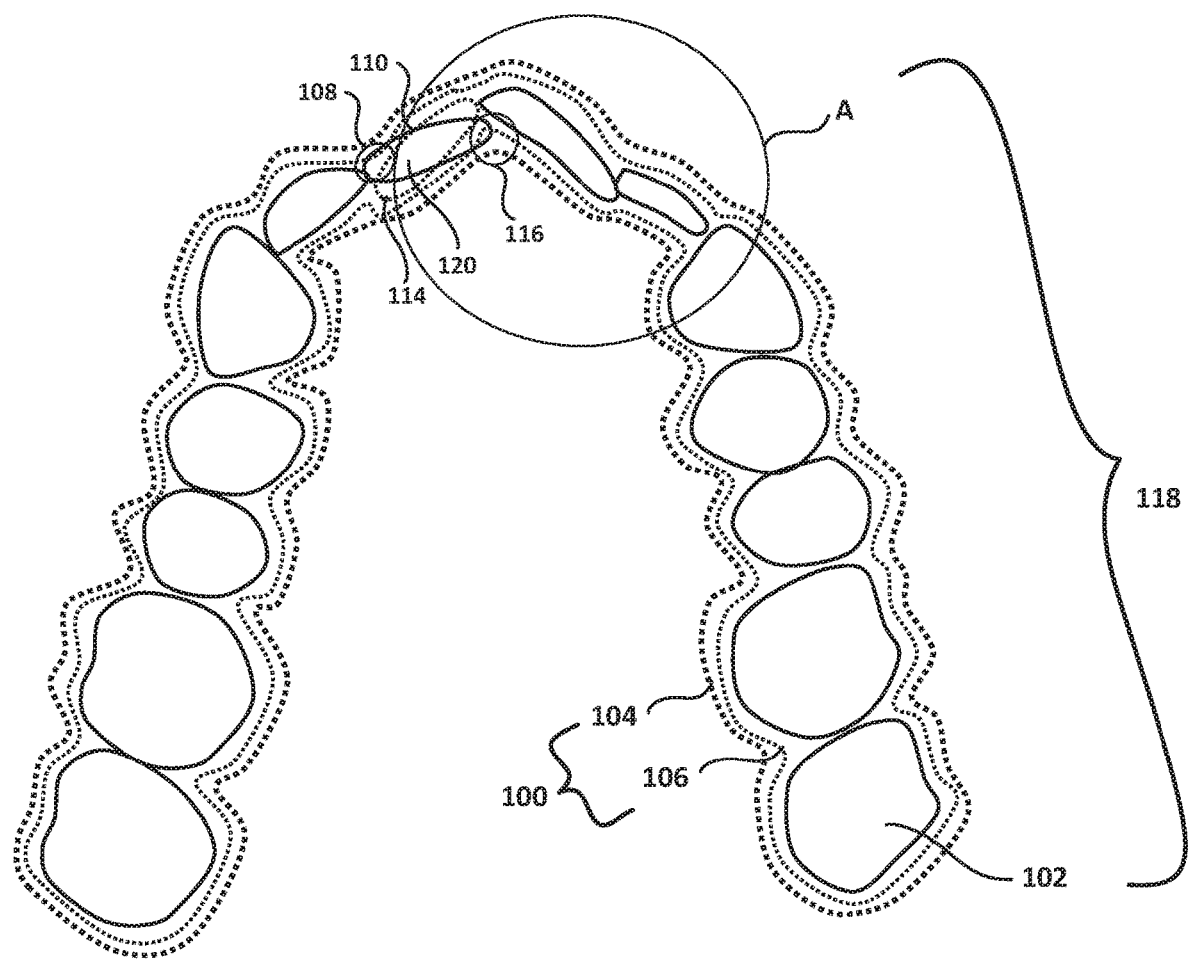
FIG. 1A illustrates the dual aligner assembly, in accordance with an embodiment.

The drawings referred to in this description should be understood as not being drawn to scale except if specifically noted.

SUMMARY OF EMBODIMENTS

In one embodiment, a dual aligner assembly includes a plurality of aligners. The plurality of aligners includes a first aligner and a second aligner. The first aligner includes a first material having a first shape corresponding to a set of target tooth positions, wherein the first aligner applies a first orthodontic force against a set of target teeth of a plurality of teeth of a dental arch of a patient, wherein the first orthodontic force generates movement of the set of target teeth to the set of target tooth positions. The second aligner includes a second material having a second shape corresponding to a combination of current tooth positions of the set of target teeth, the set of target tooth positions, and a thickness of the first aligner, wherein the second aligner partially encloses the first aligner and provides an anchor for at least a portion of the first aligner, wherein via the anchor, a combination of the first aligner and the second aligner provides added support for the accurate movement of the target teeth to the set of target tooth positions via the first orthodontic force and prevents the set of target teeth from moving to unwanted tooth positions during orthodontic treatment.

In one embodiment, the first aligner is an inner aligner that is partially enclosed by an outer aligner. In another embodiment, the second aligner is an outer aligner that partially encloses an inner aligner. In yet another embodiment, the second aligner is an inner aligner that is partially enclosed by a third aligner.

In one embodiment, the unwanted tooth positions include tooth positions other than the following tooth positions: the current tooth positions of the set of target teeth; one or more tooth positions that represent movement of at least one tooth of the set of target teeth to the set of target tooth positions; and the set of target tooth positions.

In one embodiment, the second aligner is more rigid than the first aligner. In one embodiment, the second aligner is less rigid than the first aligner. In one embodiment, the second aligner is equal in rigidity to the first aligner.

In one embodiment, the first aligner includes: a first force enlargement element. The first force enlargement element includes: a contact region between the first aligner and the second aligner, wherein the contact region provides an anchor point at the second aligner and for the first aligner, whereby the first orthodontic force, via the anchor point and by the first aligner, is increased against at least one tooth of the set of target teeth.

In one embodiment, the first force enlargement element includes a dimple. In another embodiment, the first force enlargement element includes a ridge. In yet another embodiment, the first force enlargement element includes an outward protrusion. A dimple and a ridge, in some instances, are formed to be outward protrusions.

In one embodiment, the dual aligner assembly includes a second force enlargement element. The second force enlargement element includes: a non-contact region between the first aligner and the second aligner, wherein the non-contact region provides an area into which a movement of at least one tooth of the set of target teeth to at least one target tooth position of the set of target tooth positions is accomplished. In one embodiment that includes the second force enlargement element, the first aligner includes a dimple. In another embodiment that includes the second force enlargement element, the first aligner includes a ridge. In yet another embodiment that includes the second force enlargement element, the first aligner includes an outward protrusion.

In one embodiment, the plurality of aligners further includes: a third aligner that includes a second material having a third shape corresponding to a combination of the current tooth positions of the set of target teeth, the set of target tooth positions and a thickness of the second aligner, wherein the third aligner partially encloses the second aligner and provides an anchor for at least a portion of the second aligner, wherein via the anchor, a combination of the first aligner, the second aligner and the third aligner provides a third orthodontic force that prevents the set of target teeth from moving to unwanted tooth positions during orthodontic treatment. In one embodiment, including the third aligner, the unwanted tooth positions include tooth positions other than the following tooth positions: the current tooth positions of the set of target teeth; one or more tooth positions that represent movement of at least one tooth of the set of target teeth to the set of target tooth positions; and the set of target tooth positions.

In one embodiment, the third aligner is an inner aligner that is partially enclosed by an outer aligner. In another embodiment, the third aligner is an outer aligner that partially encloses an inner aligner. In yet another embodiment, the third aligner is an inner aligner that is partially enclosed by a fourth aligner. Of note, the fourth aligner, in one embodiment, includes the features described herein in relation to the third aligner, except that the fourth aligner also accommodates not only the features of the first and second aligner, but also accommodates the features of the third aligner.

In one embodiment, a dual aligner assembly includes: a plurality of aligners. The plurality of aligners includes a first aligner and a second aligner. The first aligner includes a first material having a first shape corresponding to a first set of target tooth positions, wherein the first aligner applies a first orthodontic force against a set of target teeth of a plurality of teeth of a dental arch of a patient, wherein the first orthodontic force generates movement of the set of target teeth to the first set of target tooth positions. The second aligner includes a second material having a second shape corresponding to a combination of current tooth positions of the set of target teeth, the first set of target tooth positions, at least a second set of target tooth positions, and a thickness of at least the first aligner. The second aligner partially encloses the at least first aligner and provides an anchor for at least a portion of the at least first aligner. Via the anchor, a combination of the first aligner and the second aligner and any intermediate aligner positioned between the first aligner and the second aligner provides added support for the movement of the target teeth to the set of target tooth positions and provides a second orthodontic force that prevents the set of target teeth from moving to unwanted tooth positions during orthodontic treatment.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

Embodiments disclosed herein include a dual aligner assembly for moving teeth to a desired position. For example, the dual aligner assembly includes an outer aligner, and at least one inner aligner. The inner aligner(s) is formed based on the patient's teeth position in the next stage. In one embodiment, the inner aligner(s) is made of soft and thin polymeric film. The outer aligner is formed based on the combination of the current position and the "next" position of the patient's teeth, as well as the thickness of the inner aligner(s). In one embodiment, the outer aligner is made of hard and thick polymeric film. (It should be noted that in various embodiments, the inner and outer aligner may be composed of material having more, less, or the same amount of rigidity.) The outer aligner functions as anchorage for the inner aligner(s), enabling the inner aligner(s) to move the patient's teeth to desired positions with larger and more accurate forces than enabled by conventional aligner systems.

The dual aligner assembly, in various embodiments, includes protrusions (e.g., dimples, ridges) that increase the engagement between the outer aligner and the inner aligner(s), thereby providing even greater anchorage support to the inner aligner(s). For example, dimples and/or ridges may be formed in the inner aligner and fill a portion of the gap between the outer aligner and the inner aligner(s) or between multiple inner aligners. These dimples and/or ridges aid in creating more accurate forces near the patient's gingival line to move the patient's teeth to the desired teeth positions.

Thus, embodiments enable an increase of force that may be applied by the inner surface of the most inner aligner against a patient's tooth or teeth in order to move the patient's teeth to desired tooth positions. Using this novel technology, difficult tooth movement may be accomplished, such as posterior arch expansion, pure translation and multiple teeth extrusion. For example, a multiple anterior tooth extrusion may be performed to fix a patient's open bit, a posterior distalization may be performed to create space in order to resolve spacing issues in a patient's bit, and a patient's posterior cross bite or scissor bite may be fixed by moving a patient's molar faster than would be accomplished with conventional technology. Of note, the embodiments described herein may be applied to achieve any type of tooth movement, in any direction, in any arbitrary plane of space.

The discussion begins with a description of a conventional aligner system. Continuing, the discussion turns to a description of embodiments of a novel dual aligner assembly, according to various embodiments.

Figure 1B:
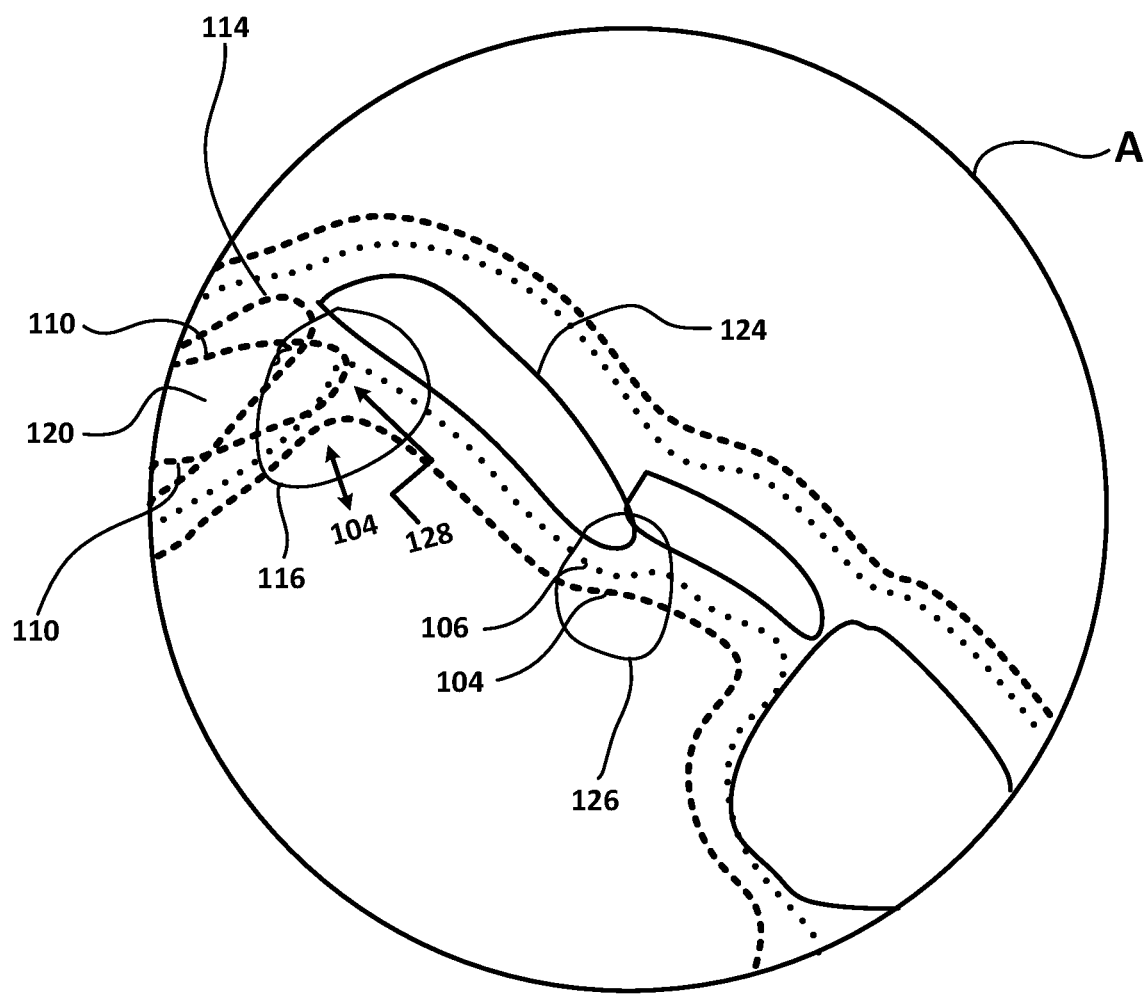
FIG. 1B illustrates an enlarged section A of the dual aligner assembly shown in FIG. 1A, in accordance with an embodiment.

FIGS. 1A and 1B illustrate the dual aligner assembly, in accordance with embodiments.

FIGS. 2A-2E illustrate sections of various dual aligner assemblies having been snapped onto the patient's teeth, including example dimple and ridge protrusions, in accordance with embodiments. FIGS. 2F-2I illustrate example designs/configurations of ridged protrusions.

Figure 4C:
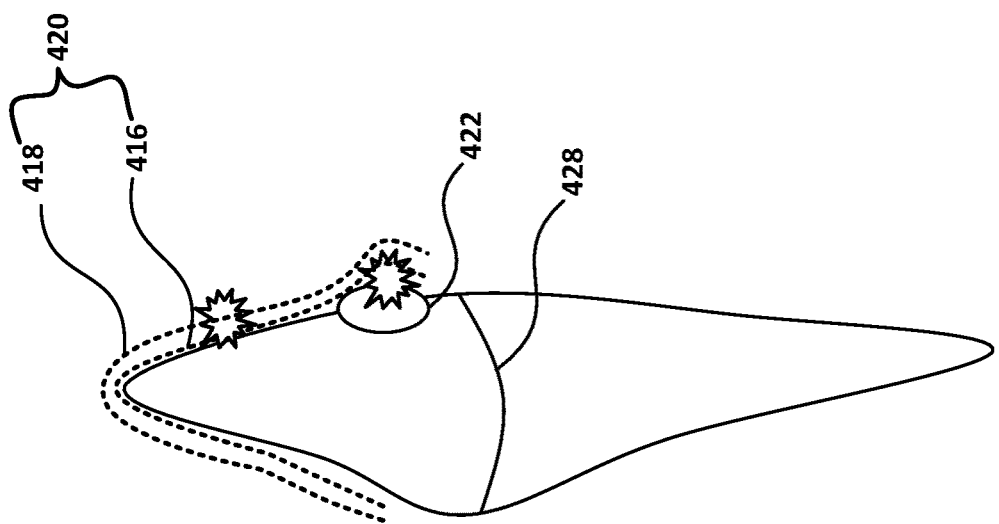
FIG. 4C illustrates a dual aligner assembly snapped onto the patient's teeth, in accordance with an embodiment.
Figure 4B:
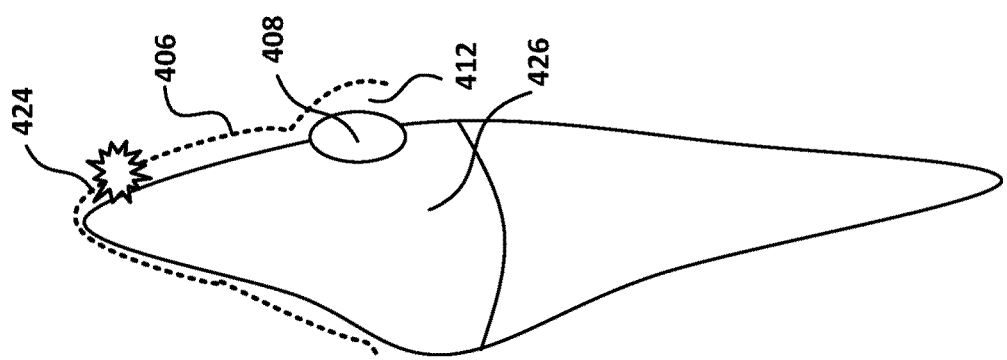
FIG. 4B illustrates a side-perspective view of the conventional aligner system of FIG. 4A.
Figure 4A:
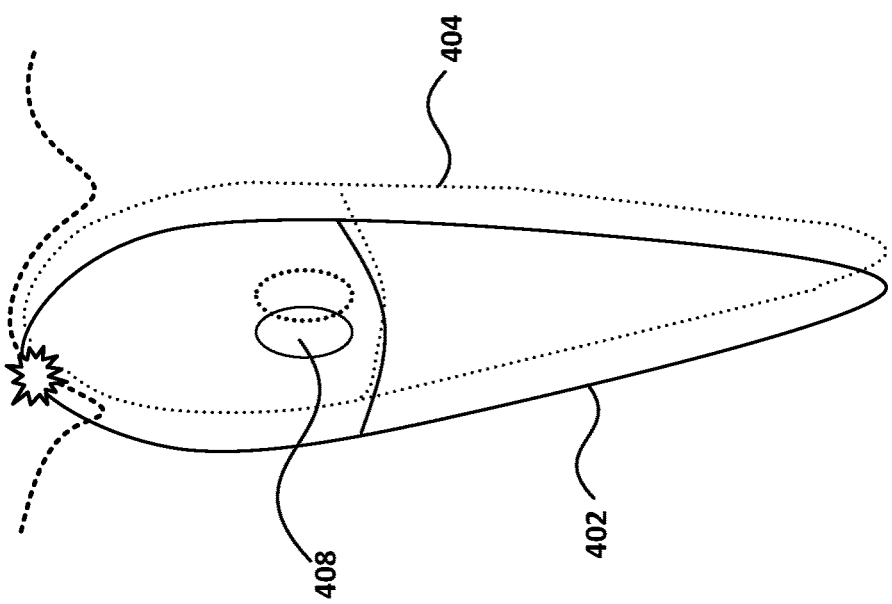
FIG. 4A illustrates a conventional aligner system.

FIGS. 3A and 3B illustrate aligner action resulting from implementation of a conventional aligner. FIGS. 3C and 3D illustrate aligner action resulting from implementation of the dual aligner assembly. FIGS. 4A and 4B illustrate aligner action resulting from implementation of a conventional aligner. FIG. 4C illustrates aligner action resulting from implementation of the dual aligner assembly.

Figure 5A:
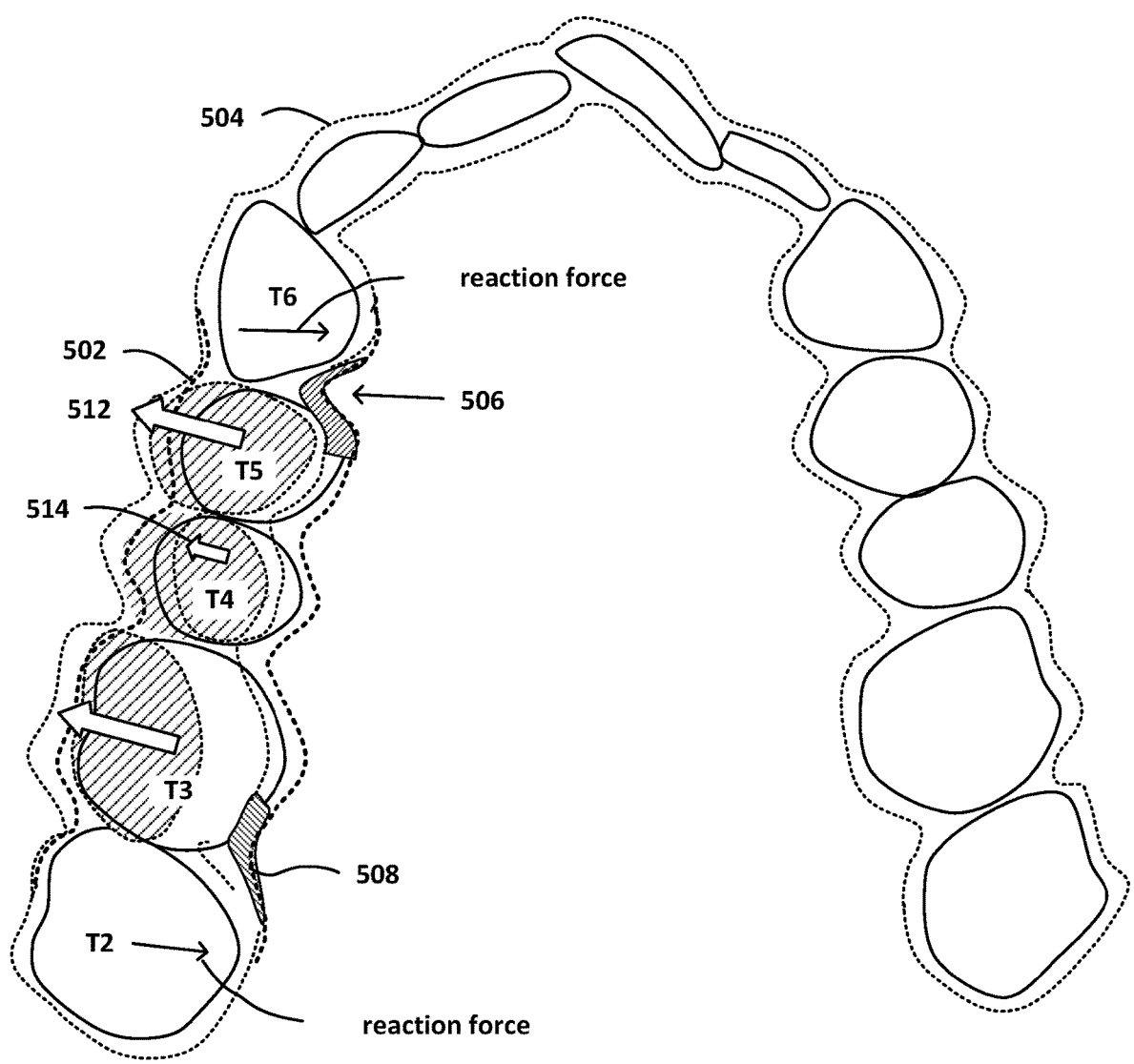
FIG. 5A illustrates a single aligner of a conventional aligner system pressing against the lingual surface of the teeth.
Figure 5B:
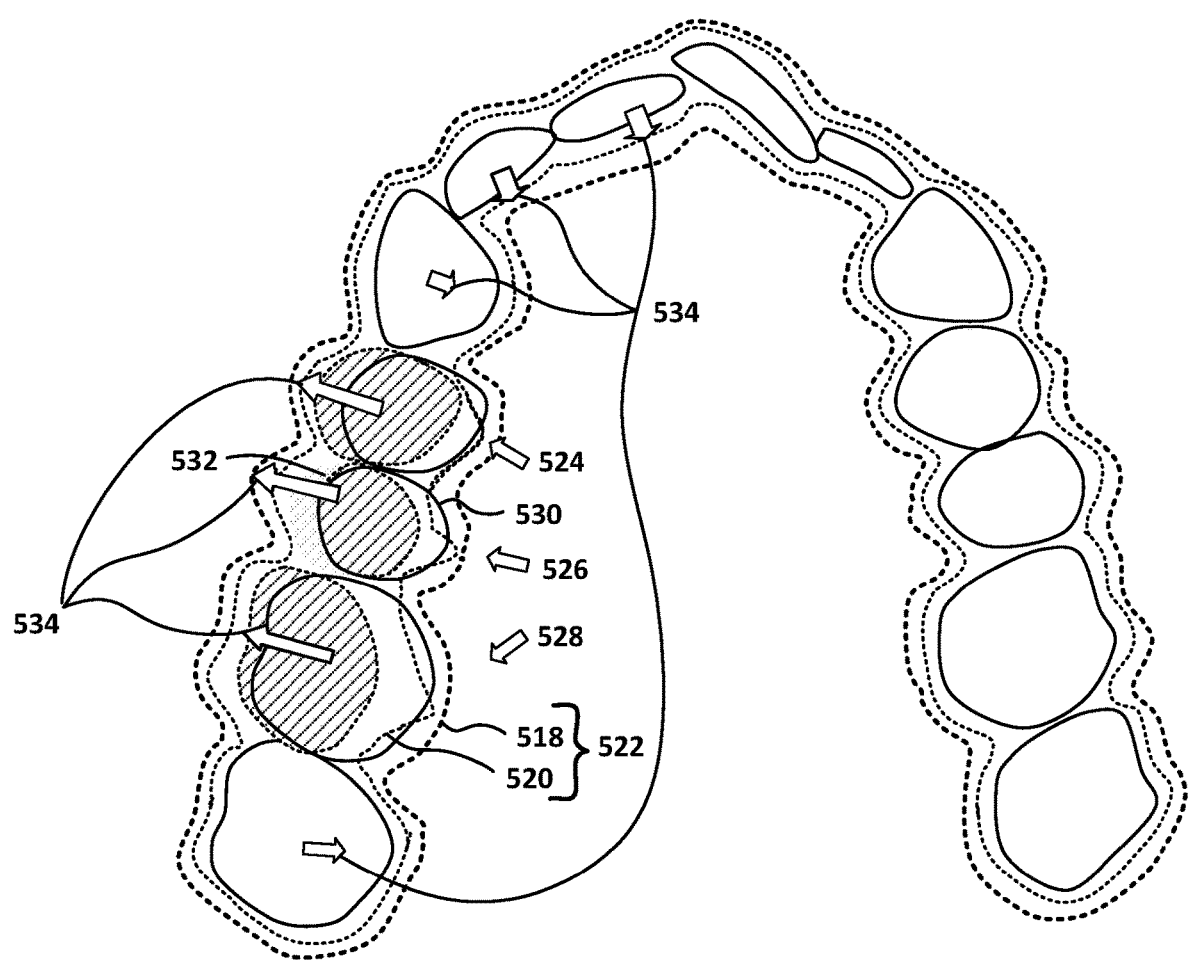
FIG. 5B illustrates a dual aligner assembly, in accordance with an embodiment.

FIG. 5A illustrates the limitations of a conventional aligner system and the benefits of the novel dual aligner assembly. FIG. 5B illustrates the novel dual aligner assembly in operation.

Conventional Aligner System

Conventional aligner systems are used to treat thousands of mild and moderately difficult orthodontic cases each month. Conventional aligner systems include many technological improvements that improve the predictability and performance of the product, thereby also enabling the conventional aligner system to treat more difficult orthodontic cases.

For example, such technological improvements include optimized attachments, power ridges, and rubber bands. Some optimized attachments are shown to improve the rotation of premolars and canines to fix severe crowding, while other optimized (extrusion) attachments are shown to extrude anterior incisors to fix an open bite. The power ridge technology is shown to move the root lingually, to improve the clinical profile of an upper jaw. The rubber band technology is shown to help A/P movement (NP class correction). Even given the latest technological improvements, there currently exist many limitations to aligner systems.

In the conventional aligner system, the tooth's initial position is acquired from the patient's initial impression without treatment. The treatment goal is set up by the software and/or the user as the final desired position. Between the tooth's initial position and the tooth's final position, some intermediate positions are created through tooth path planning and can be assigned the symbols i (tooth's initial position) and i+1 (an intermediate position). To achieve the movement from i to i+1, the patient wears the aligner that is manufactured based on the position i+1.

One major problem with the conventional aligner system is the lack of predictability of tooth movement, such as when teeth do not follow the planned tooth movement from i to i+1 and when the lag of the movement from i to i+1 is too large. When the lag is too large, the difference between the current teeth position and the aligner is also too large so that the aligner cannot be snapped onto the teeth anymore. When this situation occurs, the planned treatment has to be restarted ("middle course correction"), the remaining manufactured aligners are wasted, and the required treatment time is extended.

One of the causes of the movement lag is that the force from the aligner is too small or not in the correct direction of the desired tooth movement. The aligner itself is plastic and is in the shape of teeth, and the force created by the aligner placed on the teeth comes from the deformation of the plastic shell of the aligner. The deformation is caused by the patient's teeth pushing against the plastic shell. In general, the conventional aligner is more rigid near the incisal edge of the patient's tooth and is weaker near the gingival line of the patient's tooth. Thus, the same deformation created by the patient's teeth pushing against the plastic shell at the gingival line will produce less force than the patient's teeth pushing against the plastic shell at the incisal edge. Additionally, when the plastic shell is deformed near one tooth at the gingival line, the plastic shell opens up and it is possible that the plastic shell does not touch nearby teeth near the gingival line.

Yet another problem with conventional aligners involves the group movement of teeth, such as when all the teeth are moved in the same direction. For example, when performing an arch expansion procedure, the patient's posterior teeth are moved as a group in the buccal direction. In this situation, there is only deformation between the posterior teeth and other teeth. No force is created inside the group of posterior teeth. Thus, only the boundary teeth of this group of posterior teeth can be moved, while other teeth may still remain in the initial tooth position. This problem can be solved by moving each tooth of the group of posterior teeth one by one. However, moving teeth one by one requires more treatment time and requires more aligners to be manufactured, thereby increasing the treatment costs.

Dual Aligner Assembly

The novel dual aligner assembly, according to embodiments and as will be described herein, resolve at least the foregoing issues. In one embodiment, the dual aligner assembly includes the following structural features:

1) An inner aligner that is softer and thinner than the outer aligner. The inner aligner is manufactured based on the teeth position of the next stage (e.g., i+1). The inner aligner is used to create small and constant orthodontic force to move the teeth. Of note, while the term, "inner aligner" is used most often herein to discuss the structural features of the dual aligner assembly, the term "first aligner" is also used to describe the inner aligner, according to one embodiment.

(In another embodiment however, the term inner aligner is used to refer to an aligner that is manufactured based on the teeth position of any position of a stage of treatment that comes after the teeth position of the next stage, such as i+1+n where n is any stage of treatment after the treatment stage that follows the current position of the teeth.)

2) The outer aligner is stronger and thicker than the inner aligner. The outer aligner is big enough to hold the inner aligner. The inner aligner is able to anchor onto the outer aligner and use the outer aligner as support to provide larger and more accurate forces against the patient's teeth as the patient's teeth deform the inner aligner. Of note, while the dual aligner assembly is most often discussed herein in terms of "outer aligner"

3) The outer aligner is large enough to hold the teeth position from the initial position, i, to the next position, i+1, such that there is not extract force if the patient's teeth movement follow the planned movement treatment.

4) Features, such as dimples and/or ridges, may be added to the inner aligner to push the teeth. Dimples and/or ridges may be added to the outer aligner to create larger and more accurate forces to push the patient's teeth toward the next position, i+1.

Of note, while the dual aligner assembly is described in general with reference to an inner aligner and an outer aligner, it should be understood that the dual aligner assembly may include multiple inner aligners, each inner aligner capable of including the features described below. Further, while the dual aligner assembly is described in general with reference to an outer aligner being of a more rigid composition than the inner aligner, it should be understood that the dual aligner assembly may function as intended with an outer aligner being of a less rigid composition or of a composition with an equivalent rigidity compared to the inner aligner(s), in accordance with an embodiment.

The following is a brief description of at least some of the advantages and the benefits resulting from implementation of various embodiments of the dual aligner assembly, as will be described herein.

1) Increased Control of Gingival Force and Root Movement: When the dual aligner assembly is snapped onto the patient's teeth, and the patient's teeth push against the inner surface of the inner aligner, the inner aligner deforms and opens up. Portions of this deformation, on the outer surface of the inner aligner, push against the inner surface of the outer aligner. Since, in some embodiments, the outer aligner is more rigid than the inner aligner, the pushing of the patient's teeth against the inner aligner does not easily cause the outer aligner to also deform and open up. Since the outer aligner has a greater rigidity than the inner aligner, in response to the inner aligner pushing against the outer aligner due to the deformation, the outer aligner pushes back against the inner aligner with a designated force that causes the inner aligner to press against the patient's teeth to effect a planned movement treatment of the patient's teeth to the desired position.

For example, since the outer aligner is stronger and more rigid than the inner aligner near the gingival line, the pressing of the outer aligner against the inner aligner causes the force with which the inner surface of the inner aligner presses against the patient's teeth to be increased at the gingival line. Whereas, without the dual aligner assembly, the conventional aligner would open up at the gingival line and not be able to create the necessary force to press against the gingival line of the patient's teeth; the novel dual aligner assembly described herein provides a force for applying pressure against the patient's teeth in a planned movement treatment.

2) Increased Control of Group Movement and Posterior Expansion: In various embodiments of the dual aligner assembly, the inner aligner includes at least one dimple and/or ridge (as will be explained below with reference to FIGS. 2A-2E) designed to deform and create force to push against a particular tooth that is to be moved according to a planned movement treatment. As will be explained below in detail herein, since the outer aligner is more rigid than the inner aligner, once the dual aligner assembly is snapped onto the patient's teeth, each ridge and/or dimple of the inner aligner may be deformed outward (in the direction toward the outer aligner) by the patient's teeth pressing against the inner surface of the inner aligner. The outer surface of the dimple and/or ridge of the inner aligner then contacts the more rigid inner surface of the outer aligner. The outer aligner resists the movement outward of the edges of the dimples and/or ridges where the dimples and/or ridges contact the outer aligner (contact points), thereby causing the inner surface of the inner aligner to press against (push back with an equal and opposite force as that force applied by the inner aligner against the outer aligner) the patient's teeth at positions corresponding to the positions of the dimples and/or ridges.

3) Increased Control of Rotation of Premolar and Canine Teeth: In various embodiment of the dual aligner assembly, the more rigid outer aligner holds the inner aligner close to the patient's teeth, such that the inner aligner pushes the patient's teeth in a tangent direction, thereby creating rotation torque (as will be explained below with reference to FIGS. 3A-3D).

4) Increased Guidance and Predictability of Tooth Movement: In various embodiments of the dual aligner assembly, while the inner aligner generates force (via engagement with the outer aligner at predetermined positions) to achieve the planned tooth movement, the outer aligner provides tooth movement guidance. This will provide extra guidance for movement of the patient's teeth, compared to conventional aligners, thereby making the patient's tooth movement more predictable.

5) Increased Compliance with a Tooth's Biological Response: According to various embodiments wherein the inner aligner is softer and thinner than the outer aligner and the outer aligner is larger than the inner aligner, the dual aligner design creates more flexibility with regard to design, thereby enabling the patient's biological response to the treatment to comply with the patient's natural tooth movement.

FIG. 1A illustrates the dual aligner assembly 100 together with a patient's dental arch 118, in accordance with an embodiment. FIG. 1A shows the dual aligner assembly 100 snapped onto the dental arch 118 of a patient. The dual aligner assembly 100 includes multiple aligners, wherein at least one inner aligner 106 is housed within an outer aligner 104. For example, in one embodiment, and as shown in FIG. 1A, the dual aligner assembly 100 includes the inner aligner 106 and the outer aligner 104.

The inner aligner 106 is the aligner that is positioned to be closer to the patient's teeth 102. The inner aligner 106 is designed and manufactured to hold the patient's teeth 102 in the desired next position (e.g., i+1). In one embodiment, the inner aligner 106 is made of a soft and thin plastic film and delivers small and constant orthodontic force to the patient's teeth 102 at predetermined contact points, such as at contact region one 108 and contact region two 116. The shape of the inner aligner 106 is the shape of all of the patient's teeth 102 posited in the next position of treatment, i+1, such as the target tooth position 114. FIG. 1A shows the patient's tooth 120 in its current position. As can be seen, the inner aligner 106 is shaped to accommodate holding the patient's tooth 120 in the target tooth position 114.

The outer aligner 104 partially encloses the inner aligner 106 and is designed to hold the inner aligner 106 and to hold the patient's tooth 120 in either the tooth's current position 110 or the target tooth position 114, or any tooth position representing planned treatment movement to achieve the target tooth position 114 from the tooth's current position 110. The outer aligner 104 is made of hard or thick plastic film and provides anchorage for the inner aligner 106. The shape of the outer aligner 104 is the shape of the combined shapes of the patient's teeth 102 in their current position 110 and patient's teeth 102 in the target tooth position 114. The shape of the outer aligner 104 also accommodates the thickness of the inner aligner 106.

Thus, if the patient's tooth 102 is moving to the target teeth position 114, i+1, then the outer aligner 104 does not create any extract forces against the patient's tooth 120 (or teeth). However, if the patient's tooth 102 is even slightly wavering (moving away) from the determined movement pathway from the tooth's current position 110, i, to the target teeth position 114, i+1, then the outer aligner 104 presses against the inner aligner 106, thereby creating an extracting force against the patient's tooth 120 that is wavering from the desired treatment movement pathway. Of note, the description herein regarding the dual aligner assembly 100 is described in terms of the patient's tooth 120 for the purposes of brevity and clarity in explanation, but it should be understood that the same principals described herein may be applied to more than one tooth of the patient's plurality of teeth 102.

FIG. 1A also shows the contact region one 108 and the contact region two 116. Each contact region includes the section of the inner aligner 106 which is contacted by the patient's tooth 120 as well as the material of the inner aligner 106 surrounding the contact point (that is affected by the tooth contact). As seen at contact region one 108 and the contact region two 116 and illustrating the dual aligner assembly 100 in operation, the patient's tooth 120 contacts the inner aligner 106. As a result of this contact, the inner aligner 106 deforms at the contact regions, and the material at the contact regions one 108 and two 116 are stretched outward toward the outer aligner 104. If this stretched portion contacts the outer aligner 104, the outer aligner 104 functions to reduce and/or eliminate any further stretching of the inner aligner 106 outwards. This reduction and/or elimination of any further stretching is effected since the outer aligner 104, in accordance with an embodiment, is designed with a higher rigidity than the inner aligner 106. The outer aligner 104 pushes back against the inner aligner 106 with the same force at which the inner aligner 106 is pressing against the outer aligner 104. The inner aligner 106 then translates this force to the patient's tooth 120 by pressing against the patient's tooth 120, supported by the anchoring engagement with the outer aligner 104, and guides the patient's tooth 120 toward the target tooth position 114.

FIG. 1B illustrates an enlargement of section A of FIG. 1A. FIG. 1B shows the contact region two 116 in which the patient's tooth 120 is contacting the inner aligner 106. Depending upon the particular shape of the inner aligner 106, the patient's tooth 120 pushes the inner aligner 106 outward a certain distance into the gap area 128. The inner aligner 106 and the outer aligner 104 are manufactured such that upon being pushed some predetermined distance outward, the inner aligner 106 contacts the outer aligner 104. While the patient's tooth 120 is able to push the inner aligner 106 outward toward the outer aligner 104 and even cause the inner aligner 106 to contact the outer aligner 104, since the outer aligner 104 is stronger and more rigid than the inner aligner 106, the patient's tooth 120 is less able to also cause the outer aligner 104 to be pushed outwards. In response to inner aligner 106 pressing against the inner surface of the outer aligner 104, the outer aligner 104 pushes back against the inner aligner 106, and hence the patient's tooth 120, with an equal and opposite force. Thus, the inner aligner 106 anchors against the outer aligner 104 and translates the force pressed against its outer surface, from the outer aligner 104, to the patient's tooth 120.

Next, the potential contact region 126 near the patient's second tooth 124 will be discussed. If the dual aligner assembly 100 is designed such that the patient's second tooth 124 moves and contacts the inner aligner 106 within the potential contact region 126, the outer aligner 104 will prevent the inner aligner 106 from stretching outward much further (if any further), thereby substantially stopping the outward stretching of the inner aligner, and therefore keep the patient's second tooth 124 within a certain predetermined distance from its original position. Thus, even though the movement of one tooth or the pressure applied by the aligner on one tooth may cause movement in another neighboring tooth, the outer aligner may be designed to reduce or eliminate this unwanted movement of the patient's neighboring tooth.

Shaped Features for the Inner Aligner (e.g., Dimple, Ridge)

In various embodiments, the inner aligner is manufactured to include shaped features thereon, such as, but not limited to, dimples and/or ridges. Since the outer aligner is larger than the inner aligner, in many situations, there may be some gap area between the two aligners. This gap area can be filled by these shaped features, thereby enabling interactivity between the inner aligner and the outer aligner. As will be explained, with reference to FIGS. 2A-2E, shaped features, such as a dimple and/or a ridge, will provide extract and controllable forces to push the patient's teeth toward target tooth positions. Of note, while FIGS. 2A-2E illustrate dimples and ridges, it should be understood that the shaped features may be of a shape other than dimples and ridges, but that are capable of providing extract and controllable forces as will be described herein.

Various designs, orientations, and/or configurations of shaped features are available for use according to embodiments. Shaped features achieve force profiles favorable to specific types of tooth movement and can include both attachment-type features as well as non-attachment type features. Non-attachment type features can include various shaped alterations or protrusions in a surface of the dual aligner assembly, such as ridges (e.g., interior or exterior), dimples, and the like. The terms "non-attachment type feature" and "protrusion" (e.g., appliance protrusion) are typically used interchangeably herein. Dimples, for example, may be protrusions having substantially the same dimensions along a width compared to the protrusion length. Ridges, by comparison, for example, are protrusions having an unequal length and width. Interior protrusions, such as interior ridges, include a groove or protrusion in an inner aligner that recesses toward an inner surface (e.g., tooth contacting surface) of the inner aligner. Exterior protrusions and ridges bulge toward an exterior surface of the inner aligner system. Protrusion type features, such as dimples and ridges, can be either filled with material (e.g., composite material) or left unfilled. If it is filled, the composite can be controlled to solidify after the desired shape and/or volume of the filler is obtained. In the following discussion, the general term "feature" will be used. But the methods apply on any feature as appropriate.

In some instances, ridge-shaped protrusions may provide differences and/or advantages for an application of force to the patient's teeth compared to other protrusion shapes, such as dimples. For example, dimples having a substantially equal length compared to width will typically provide more of a point application of a force to a surface of a tooth. By comparison, a ridge-shaped protrusion may allow an application of force to be more evenly distributed along a surface of a tooth, and may provide more precisely controlled tooth movement in some instances. Further, ridge-shaped protrusions provide more protrusion configuration and design options, provide a greater range of force values that can be selected and delivered to the target tooth compared to non-ridge shapes (such as dimples), and can therefore be more likely to impart the desired load against the target tooth. As such, the use of ridges compared to other more simplified shapes (e.g., a single dimple) provide a greater range of available force values or selections for imparting the desired load vector, or force direction and/or magnitude along a tooth surface, thereby providing more treatment options.

As noted, various designs, orientations, and/or configurations of shaped features are available for use according to the present invention and can depend, at least partially, on the desired application of force and tooth movement. Exemplary designs/configurations of ridged protrusions are illustrated with reference to FIGS. 2F-2I, as will be explained below.

Figure 2A:
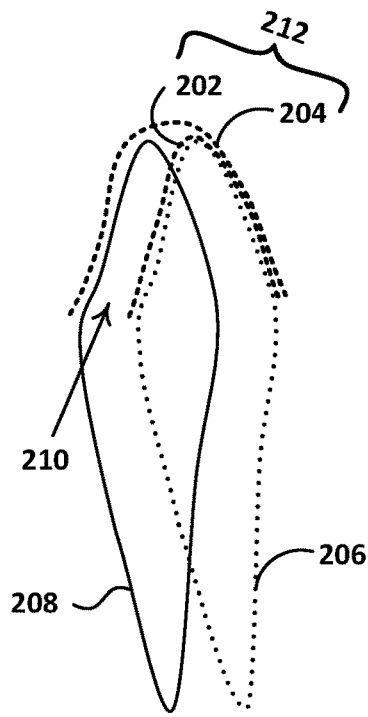
FIG. 2A illustrates the dual aligner assembly, in accordance with an embodiment.

FIGS. 2A-2E illustrates sections of various dual aligner assemblies together with the patient's dental arch, in accordance with embodiments. FIG. 2A illustrates the dual aligner assembly 212, the inner aligner 202 and the outer aligner 204 designed in combination, to cause the patient's tooth to move to the right. The inner aligner 202 is manufactured based on the next position, i+1 (tooth in target position 206), while the outer aligner 204 is manufactured based on the combination of the tooth in its current position 208, i, and the tooth in its target position 206, i+1. In FIGS. 2A-2E, there exists a gap 210 between portions of the inner aligner 202 and the outer aligner 204, wherein the gap 210 is a gap near the gingival line.

As shown in FIG. 2A, once the dual aligner assembly 212 is snapped onto the patient's teeth, the inner aligner 202 (which is designed to hold the patient's tooth in its target tooth position 206) is pressed outward toward the inner surface of the outer aligner 204. The outer aligner 204 (which is designed to hold the patient's tooth either in its current position 208, in the target position 206, or any position there between) provides extra support to the inner aligner 202. For example, as the patient's tooth pushes the inner aligner 202 outward, the inner aligner 202 contacts the more rigid outer aligner 204 and the outer aligner 204 resists the movement outward by the inner aligner 202 via its greater rigidity. The outer aligner 204 provides anchorage (and thereby support) for the inner aligner 202 to resist the outward movement, thereby enabling the inner aligner 202 to avoid continued expansion outwards. The force with which the inner aligner 202 presses against the outer aligner 204 is received in an equal and opposite direction via the outer aligner 204 pressing back and against the inner aligner 202. This received force is then translated through the inner aligner 202 to the patient's tooth. This translated force causes the inner aligner to press against the patient's tooth, guiding the patient's tooth toward the desired target position 206.

Figure 2B:
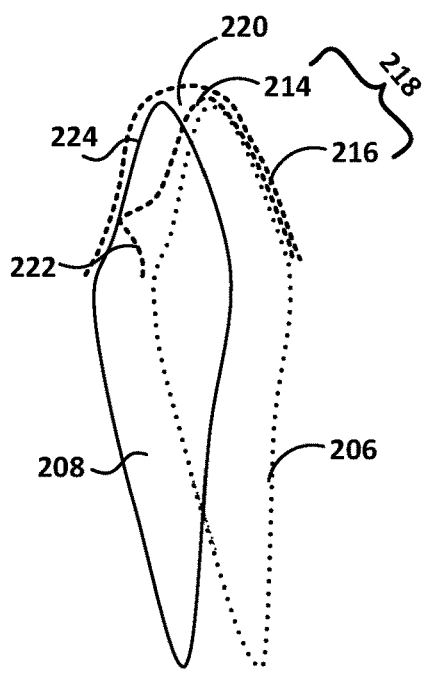
FIG. 2B illustrates a dimple formed in the inner aligner as an exterior protrusion, in accordance with an embodiment.

FIG. 2B shows a dimple 222 brined in the inner aligner 214 as an exterior protrusion, near the gingival line and partially filling the gap 220 of the dual aligner 218, according to an embodiment. As shown, the inner aligner 214 is shaped to accommodate the patient's tooth 224 in a target position 206. Thus, when the dual aligner assembly 218 is snapped onto the patient's teeth, a portion of the patient's tooth pushes against the inner surface of the inner aligner 214, thereby stretching the inner aligner 214 outwards toward the outer aligner 216. When stretched outward, the outer edge of the dimple 222 pushes against the inner surface of the outer aligner 216. Even though a portion of the inner aligner 214 is stretched outward, the end of the dimple 222 that pushes against the inner surface of the outer aligner 216 anchors against the outer aligner 216. At this anchorage point, the inner aligner 214, via the support of the outer aligner 216, provides the resistance to the patient's tooth from moving outwards in the direction of the dimple 222. When stretched outward, the outer edge of the dimple 222 pushes against the inner surface of the outer aligner 216. Even though a portion of the inner aligner 214 is stretched outward, the end of the dimple 222 that pushes against the inner surface of the outer aligner 216 anchors against the outer aligner 216. At this anchorage point, the inner aligner 214, via the support of the outer aligner 216, provides the resistance to the patient's tooth from moving outwards in the direction of the dimple 222.

Figure 2C:
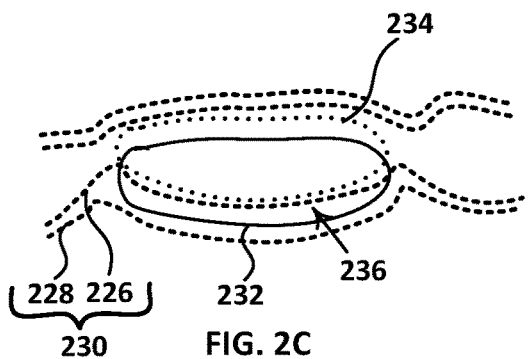
FIG. 2C illustrates a gap formed between the inner aligner and the outer aligner of the dual aligner assembly, in accordance with an embodiment.

FIG. 2C shows a gap 236 formed between the inner aligner 226 and the outer aligner 228 of the dual aligner assembly 230, according to an embodiment. As shown, the dual aligner assembly 230 is designed to move the patient's tooth upward (lingually). There is not a dimple or ridge formed in the inner aligner 226 and positioned within the gap 236.

Figure 2D:
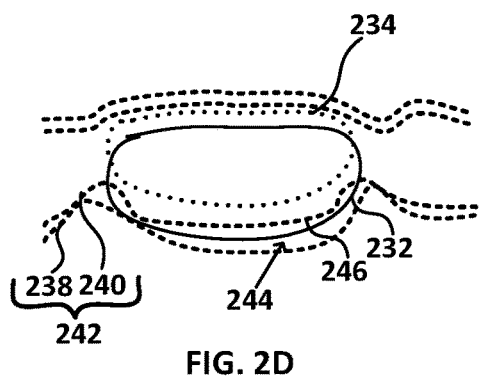
FIG. 2D illustrates a ridge formed within a gap, as an exterior protrusion of the dual aligner assembly, in accordance with an embodiment.

FIG. 2D shows a ridge formed within the gap 244, as an exterior protrusion if the dual aligner assembly 242, in accordance with an embodiment. As seen, the ridge 246 is filling the gap 244 near the gingival line. The patient's tooth 232 contacts the inner aligner 240. In response to this contact, the inner aligner 240 expands outwards toward the outer aligner 238. The outside surface of the ridge 246 of the inner aligner 240 contacts the inner surface of the outer aligner 238. The inner surface of the outer aligner 238 pushes against the outer surface of the ridge 246, The inner surface of the ridge 246 then pushes against the patient's tooth to guide it to the target tooth position 234.

Figure 2E:
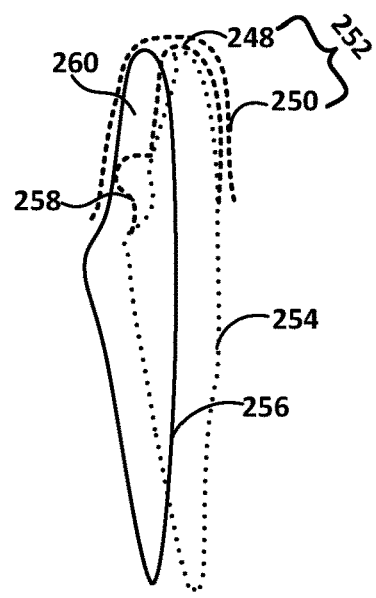
FIG. 2E illustrates a ridge formed within a gap, as an exterior protrusion, in accordance with an embodiment.

FIG. 2E shows a ridge 258 formed within a gap 260 of a dual aligner assembly 252 and between the inner aligner 248 and the outer aligner 250, as an exterior protrusion, in accordance with an embodiment. The ridge 258 is shown from the perspective of the mesial-distal direction. The ridge 258 enables the engagement of the inner aligner 248 with the outer aligner 250, enabling the inner aligner 248 to use this engagement to help anchor the inner aligner 248 such that the inner aligner 248 may remain in contact with the tooth. Via this contact, the inner aligner 248 applies a force against the tooth, moving the tooth from its current position 256 to the target tooth position 254.

Figure 2F:
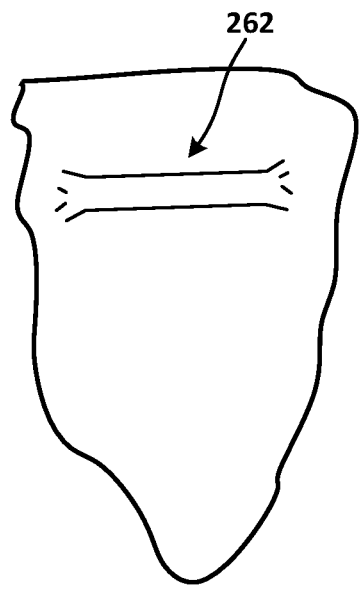
FIG. 2F illustrates a ridge formed by a continuous protrusion in an aligner surface, in accordance with an embodiment.
Figure 2G:
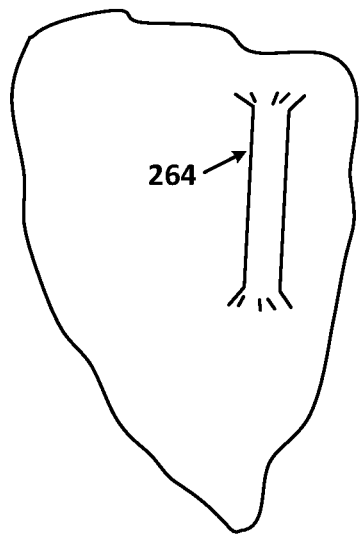
FIG. 2G illustrates a continuous ridge disposed in an appliance cavity in a vertical orientation, in accordance with an embodiment
Figure 2H:
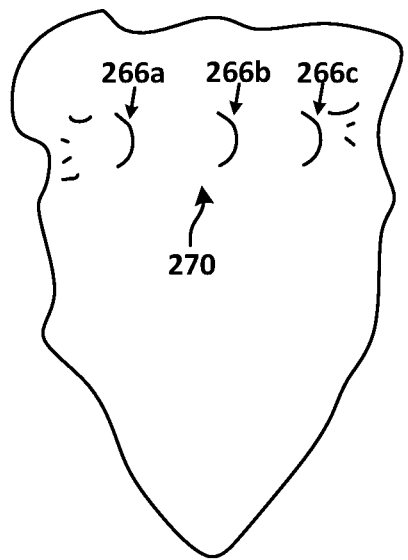
FIG. 2H illustrates a non-continuous ridge disposed in an aligner surface and vertically oriented, in accordance with an embodiment.
Figure 2I:
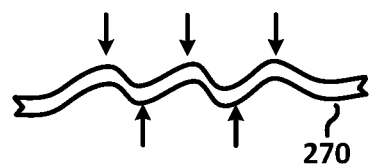
FIG. 2I illustrates a cross sectional view of the ridge.

FIG. 2F illustrates a ridge 262 formed by a continuous protrusion in an aligner surface. While the geometric features of the ridge 262 may vary along the length, the ridge 262 is continuous in the sense that it is configured to contact a tooth surface along an uninterrupted length. The ridge 262 is illustrated as having a more horizontal orientation relative to the tooth or, in other words, perpendicular to the tooth in the crown to tooth direction. Referring to FIG. 2G, a continuous ridge 264 is illustrated disposed in an appliance cavity in a vertical orientation. FIG. 2H illustrates a non-continuous ridge 270 that is disposed in an aligner surface and vertically oriented. FIG. 2I shows a cross-sectional view of the ridge 270, illustrating the sort of corrugated surface forming the non-continuous ridge by a series of dimples or bump-like protrusions 266a, 266b, 266c. As illustrated, such bump-like protrusions can each include a portion of the protrusion that contacts a tooth surface, with each tooth contacting surface of a protrusion separated by non-tooth contacting regions of the ridge having a different height. Parameters of tooth contacting and non-contacting aspects of a non-continuous ridge, as illustrated, can be defined, at least in part, by fabrication methods (e.g., direct fabrication, vacuum molding, etc.) used. Both continuous and non-continuous type ridges function to apply a force vector along a length of the tooth, rather than at a single point with a single dimple or bump-like protrusion. Shaped features, such as midges can be designed in various shapes (e.g., curve, "L" shaped, "T" shaped, hook, etc.), as well as orientations (e.g., vertical, horizontal, slanted, etc) and are not limited to any particular shape or orientation.

Any number of one or more shaped features can be included in design and fabrication of embodiments. In one embodiment, the gap between the inner aligner and the outer aligner can include a plurality of shaped features, such as protrusions. For example, the gap can include at least two shaped features, such as protrusions that are shaped and positioned within the cavity, such that each of the protrusions are brought into contact with the received patient's tooth when the dual aligner assembly is initially worn by the patient. Thus, a number of protrusions (e.g., two or more) can be configured and incorporated in the dual aligner assembly such that each of these protrusions will each engage the received tooth when the dual aligner assembly is initially worn by the patient and before the tooth has been moved by the appliance.

Besides protrusions or non-attachment type shaped features, the shaped features of the present invention can optionally include attachment type features. Attachment, as used herein, may be any form of material that may be attached to the tooth whether preformed, formed using a template or in an amorphous form that is attached to the surface of the tooth. It can be disposed on the tooth surface using an adhesive material, or the adhesive material itself may be disposed on the surface of the tooth as an attachment.

Generally, the attachments operate to provide "bumps" on a surface of the tooth which otherwise would be difficult for the dental appliance to grip. Attachments may also be engaged by the appliance in a manner that favors delivery of desired force directions and magnitudes. Attachments typically include a material bonded or attached to a surface of the tooth, with a corresponding receiving portion or couple built into the tooth receiving appliance. In one example, an attachment-type feature can include an orphan attachment, or any appropriate shaped material bonded to the crown surface, but with no receptacle or receiving portion build into the appliance to receive the attachment shape. Instead, the generated force concentrates on the contact area between the aligner surface and the attachment.

FIGS. 3A and 3B illustrate aligner action using a conventional aligner. FIGS. 3C and 3D illustrate aligner action using the dual aligner assembly, in which the root of the patient's tooth is moved buccal-lingually, in accordance with an embodiment. FIGS. 4A and 4B illustrate aligner action using a conventional aligner. FIG. 4C illustrates aligner action using the dual aligner assembly, in which the root of the patient's tooth is moved in the mesial-distal direction, in accordance with an embodiment.

With reference to FIG. 3A, the current position 302 of the patient's tooth 308 is shown, as well as the target tooth position 304 for the patient's tooth 308. The conventional aligner is shown, having been designed to form the shape of the target tooth position 304. As can be seen, the patient's tooth 308 is planned to be moved bucally (to the right direction). The single aligner 306 is formed based on the patient's target tooth position 304 in the next stage (i+1).

With reference to FIG. 3B, the single aligner 306 is shown snapped onto the patient's dental arch (in this case, a portion of the single aligner 306 is shown snapped onto a patient's tooth 308). Since the patient's tooth 308 is still in its original position, the single aligner 306 becomes deformed. Additionally, since the incisal edge 310 is more rigid than the gingival portion of the single aligner 306, at the incisal edge 310, the single aligner 306 remains stiffer and deforms less than other less rigid portions of the single aligner 306 (in response to contact with the patient's tooth 308). The portion 312 of the single aligner 306 near the gingival line tends to open outward to a certain extent, depending on its degree of rigidity. Thus, since the force with which pressure is applied against the patient's tooth 308 by the single aligner 306 is larger near the incisal edge 310 than at the gingival line, an unwanted torque 314 is created that rotates the patient's tooth 308 in an unwanted direction.

With reference to FIG. 3C, a dual aligner assembly 322 is shown snapped onto the patient's teeth, in accordance with an embodiment. FIG. 3C illustrates a portion of the outer aligner 320 and the inner aligner 318 in relation to each other. As can be seen, the inner aligner 318 is formed to be the shape of the target tooth position 328. On the other hand, the outer aligner 320 is formed to be the shape of the combination of the current tooth position 330 and the target tooth position 328. The inner aligner 318 and the outer aligner 320 are formed such that a gap 324 is created on one side of the patient's tooth between a portion of the area between the inner aligner 318 and the outer aligner 320. On the other side of the patient's tooth, the inner aligner 318 and the outer aligner 320 are formed such that the outer aligner 320 follows the form of the inner aligner 318 closely. Thus, in response to being snapped onto the patient's tooth, the inner aligner 318, which is formed to be shaped in the target tooth position 328, becomes deformed and is pushed outward by the patient's tooth. However, since the outer aligner is also formed to be the shape of the target tooth position 328 on one side of the patient's tooth, the outer aligner 320 will prevent the inner aligner 318 at the gingival area from popping outwards and keep the inner aligner 318 in contact with the patient's tooth. Since the pressure applied to the patient's tooth at the gingival line is closer to the root 332 of the tooth, a predetermined (and wanted) amount of torque 326 is applied, and the root 332 of the patient's tooth may be moved more efficiently.

With reference to FIG. 3D, a dual aligner assembly 340 is shown snapped onto the patient's teeth, in accordance with an embodiment. FIG. 3D illustrates a portion of the outer aligner 338 and the inner aligner 336 in relation to each other. As can be seen, the inner aligner 336 is formed to be the shape of the target tooth position 344, with a dimple 348 formed as an exterior facing protrusion in the inner aligner 336. On the other hand, the outer aligner 338 is formed to be the shape of the combination of the current tooth position 346 and the target tooth position 344. The inner aligner 336 and the outer aligner 338 are formed such that a gap 342 is created on one side of the patient's tooth between a portion of the area between the inner aligner 336 and the outer aligner 338. On the other side of the patient's tooth, the inner aligner 336 and the outer aligner 338 are formed such that the outer aligner 338 follows the form of the inner aligner 336 closely. Thus, in response to being snapped onto the patient's tooth, the inner aligner 336, including the dimple 348, becomes deformed and is pushed outward by the patient's tooth. However, since the outer aligner 338 is also formed to be the shape of the target tooth position 344 on one side of the patient's tooth, the outer aligner 338 will prevent the gingival area of the inner aligner 336 from popping outwards as well as keep the inner aligner 336 in contact with the patient's tooth. Thus, the outer aligner 338 applies a force against the dimple 348 (and hence the inner aligner 336) at the gingival line 350 and also applies a force 352 against the inner aligner 336 at the incisal edge of the patient's tooth. The addition of the dimple 348 (or ridge, in other embodiments) near the gingival line enables an even greater force to be applied by the inner aligner 336 against the patient's tooth near the gingival line; the addition of the dimple 348 enables the dual aligner assembly 340 to move the root of the patient's tooth even more than that movement that is created and shown in FIG. 3C.

With reference to FIG. 4A, the current position 402 of the patient's tooth is shown, as well as the target tooth position 404 for the patient's tooth, using a conventional aligner system having a single aligner 406. The conventional aligner is shown, having been designed to form the shape of the target tooth position 404 and to move the patient's tooth distally. Further, an attachment 408 is added to the tooth near the gingival line of the patient's tooth to help create more force via the contact between the single aligner 406 and the patient's tooth to move the root of the patient's tooth in the desired direction to reach the target tooth position 404.

With reference to FIG. 4B, the single aligner 406 of FIG. 4A is shown from a side perspective view as being snapped onto the patient's dental arch (in this case, a portion of the single aligner 406 is shown snapped onto a patient's tooth). Since the patient's tooth is still in its original position, the single aligner 406 becomes deformed upon contact with the patient's tooth. Such contact will push the single aligner 406 open and create space 412 between the single aligner 406 and the patient's tooth near the gingival line, so that the attachment 408 is not fully engaged and not enough force is created to move the root of the patient's tooth to the desired position. Additionally, since the incisal edge is more rigid than the gingival portion of the single aligner 406, at the incisal edge, in response to contact with the patient's tooth, the single aligner 406 deforms less than the deformations occurring at other less rigid portions of the single aligner 406. The portion of the single aligner 406 near the gingival line 426 tends to open outward to an extent dependent on its degree of rigidity. Thus, since the force with which pressure is applied against the patient's tooth by the single aligner 406 is larger near the incisal edge 424 than at the gingival line 426, an unwanted torque is created that rotates the tooth in an unwanted direction.

With reference to FIG. 4C, a dual aligner assembly 420 is shown snapped onto the patient's teeth, in accordance with an embodiment. FIG. 4C illustrates a portion of the outer aligner 418 and the inner aligner 416 in relation to each other. Although not shown, the inner aligner 416 is formed to be in the shape of the target tooth position, while the outer aligner 418 is formed to be in the shape of the combination of the current tooth position and the target tooth position. In response to being snapped onto the patient's tooth, the inner aligner 416 becomes deformed and is pushed outward by the patient's tooth. However, since the outer aligner 418 is also formed to be in the shape of the target tooth position on the side of the attachment, the outer aligner 418 will prevent the inner aligner 416 at the gingival line 428 from popping outwards and keep the inner aligner 416 in contact and engaged with the attachment point 422 of the patient's tooth. This continued engagement creates a bigger force with which the inner aligner 416 applies pressure to the patient's tooth in the distal direction.

Dual Aligner for Arch Expansion

Arch expansion is a frequently used technique to fix jaw crowding malocclusion. Arch expansion is done by moving posterior teeth (molars and premolars) in the buccal direction. With the use of conventional aligners, arch expansion may be difficult for several reasons.

Firstly, molars are bulky and are difficult to move by the conventional aligner system.

Secondly, since the conventional aligner is made from the same plastic film with uniform thickness, the force that is applied to posterior teeth is the same as the force applied to teeth other than the posterior teeth. Due to the same force being applied to different areas of the dental arch, the process of moving groups of teeth using the conventional aligner system is difficult.

Thirdly, there are difficulties moving the middle teeth of a group of teeth using the conventional aligner system. In general, conventional aligners are formed based on a group of teeth that are positioned in the next stage (i+1), so that there is no relative shape change for the teeth positioned in the middle of the group of teeth. With reference to FIG. 5A, an illustration describing the limitations of the conventional aligner system and the benefits of the novel dual aligner assembly is provided. An aligner is formed to have the shape of the patient's teeth in the target tooth position. For example, the teeth T3, T4 and T5 are targeted to move into the target tooth position 502, while all of the other teeth are targeted to remain in their current position. When the single aligner 504 is snapped onto the patient's dental arch, the aligner is deformed mostly between the moved and the stationary teeth, shown in FIG. 5A as being deformation area one 506 and deformation area two 508. Partly, this is because the portion of the single aligner 504 surrounding the tooth T5 uses the portion of the aligner surrounding the tooth T6 as anchorage to provide support for pushing the tooth T5 toward the target tooth position 502. However, there is not enough force to move the middle tooth T4 to the target tooth position, since the tooth T4 is between the two teeth, T3 and T5, which are already moving. Additionally, the neighboring teeth T2 and T6 to the moving teeth T3 and T5 may be receiving force from the deformation of the aligner occurring around the aligner area near teeth T3 and T5, thereby creating unwanted movement in the neighboring teeth T2 and T6.

According to FIG. 5A, the single aligner 504 presses against the lingual surface of the teeth T3 and T5 to move the teeth T3 and T5 in an outward direction 510 and 512, but does not apply enough force to the middle targeted tooth T4 to cause the tooth T4 to also move in an outward direction 514. The teeth of the dental arch shown in FIG. 5A, other than the teeth T3, T4 and T5, are not targeted to move. It can be seen that when the conventional aligner (single aligner 504) is snapped onto the patient's dental arch, the aligner deformation mostly happens between the moved and the stationary teeth, such as between the teeth T5 and T6 at deformation area one 506 and between teeth T2 and T3 at deformation area two 508. There may be enough force to move teeth that are near the stationary teeth, but there is not enough force provided by the single aligner 504 against the patient's teeth to move the middle tooth T4 of the group of the targeted teeth.

FIG. 5B illustrates a dual aligner assembly 522 in operation, in accordance with an embodiment. An inner aligner 520 is formed to have the shape of the patient's teeth in the target tooth position 532. For example, the teeth T3, T4 and T5 are targeted to move to the target tooth position 532, while all of the other teeth are targeted to remain in their current position. An outer aligner 518 is formed to have the shape of the combination of the patient's teeth in their current position and the target tooth position 532. Dimples and/or ridges may be formed as part of the inner aligner 520 or attached thereto. For example, FIG. 5B shows dimple one 524, dimple two 526 and dimple three 528 formed in the inner aligner 520 to fill a portion of the gap 530 between the inner aligner 520 and the outer aligner 518 on the lingual side of the teeth. Upon snapping the dual aligner assembly 522 onto the teeth, the inner aligner 520 becomes deformed outward and the dimples 524, 526 and 528 make contact with the outer aligner 518. Forces are then created by which the inner aligner 520 presses against the patient's teeth at the base of the dimple regions. The outer aligner 518 is rigid enough such that each dimple positioned next to a different tooth experiences about the same deformation, such that similar forces against the teeth are created at the dimple regions (the dimple region includes the dimple base and point). The reaction forces 534 to the pressure applied by the inner aligner 520 against the patient's teeth near the dimple regions are then distributed such that the patient's entire dental arch functions as an anchorage for the inner aligner 520 to provide support for the movement of the target teeth, T3, T4 and T5. The outer aligner 518 provides support to the inner aligner 520, even at the position of the middle tooth T4, such that the inner aligner 520 is able to provide enough force to the patient's middle tooth T4 to move the middle tooth to the desired target tooth position 532. Instead of being deformed outwards after being snapped onto the patient's teeth, the outer aligner 518 provides anchorage for the inner aligner 520, prevents the inner aligner 520 from deforming outwards, and keeps at least portions of the inner aligner 520 in contact with the patient's teeth. Through such as system, the middle tooth T4 may also be moved to a target tooth position 532. As noted earlier, the outer aligner 518, in one embodiment, is made from a stronger and thicker material than the inner aligner 520. Additionally, since the outer aligner 518 is the envelope of the current and the next position, there is minimum deformation to the inner aligner 520 due to the tooth position change of the targeted teeth T3, T4 and T5. In contrast, in the conventional aligner system with a single aligner, only the neighboring teeth would provide anchorage support for the movement of the target teeth, T3, T4 and T5.

Multiple Intermediate Aligners of the Dual Aligner Assembly

As described herein, in some embodiments, the dual aligner assembly includes an inner aligner, an outer aligner, and one or more intermediate aligners for being positioned between the inner aligner and the outer aligner. For example, in one embodiment, a dual aligner assembly includes a plurality of aligners. The plurality of aligners includes a first aligner and a second aligner. The first aligner includes a first material having a first shape corresponding to a first set of target tooth positions, wherein the first aligner applies a first orthodontic force against a set of target teeth of a plurality of teeth of a dental arch of a patient, wherein the first orthodontic force generates movement of the set of target teeth to the first set of target tooth positions. The second aligner includes a second material having a second shape corresponding to a combination of current tooth positions of the set of target teeth, the first set of target tooth positions, at least a second set of target tooth positions, and a thickness of at least the first aligner. According to some embodiments, there exists an intermediate aligner in between the first aligner and the second aligner. The intermediate aligner is formed based on a second set of target tooth positions that is different from the first set of target tooth positions. The second aligner, in turn, accommodates not only the first set of target tooth positions considered by the first aligner, but one or more other sets of target tooth positions considered by the one or more intermediate aligners. The second aligner also accommodates the thicknesses of the first aligner and any intermediate aligner.

According to an embodiment, the second aligner partially encloses at least the first aligner (as well as any intermediate aligners) and provides an anchor for at least a portion of at least the first aligner (and any intermediate aligners). Via the anchorage (the principal of operation of which is described herein), a combination of the first aligner and the second aligner and any intermediate aligner positioned between the first aligner and the second aligner provide a second orthodontic force that prevents the set of target teeth from moving to unwanted tooth positions during orthodontic treatment.

The term, "unwanted tooth positions", includes tooth positions other than the following tooth positions: the current tooth positions of the set of target teeth; one or more tooth positions that represent movement of at least one tooth of the set of target teeth to any set of target tooth positions (including the first set of target tooth positions and at least a second set of target tooth positions); and any set of target tooth positions (including the first set of target tooth positions and at least a second set of target tooth positions).

Each of the inner aligners of the multiple aligners, in various embodiments, may include inward and/or outward protrusions (e.g., dimples, ridges, etc.), the operation of which are described herein.

Thus, in some embodiments, the dual aligner assembly includes three or more aligners which are combined to provide more exact and desired forces directed toward a predetermined tooth/teeth, in order to provide a more efficient and accurate orthodontic process.

Manufacturing the Dual Aligner Assembly

In general, the steps of manufacturing the dual aligner assembly include the following: 1) Create a mold of the jaw with the patient's teeth positioned in the next stage position. 2) Use a vacuum thermoforming process to create the inner aligner from the mold. 3) Create a combined model of the patient's teeth, in the current stage and the next position. Then, inflate the model with a thickness of the inner aligner thickness. 4) Create a mold of a combined jaw model, using a vacuum thermoforming process to create the outer aligner from the mold. 5) Snap the inner model into the outer aligner to create the "dual aligner assembly".

The outer aligner is made from the combination of teeth from the current position of the patient's teeth (i) and the desired next stage position (i+1) of the patient's teeth. According to an embodiment, the manufacture of the outer aligner is different from the conventional manufacture of an aligner for the patient's teeth in the current position of the teeth as well as different from the conventional manufacture of a single aligner. Further, the manufacture of the outer aligner, according to embodiments, is different from the manufacture of the inner aligner of the dual aligner assembly.

A more detailed description of process for manufacturing the outer aligner is as follows.

To create the outer aligner, the first step is building a 3D solid model to combine the teeth in two positions, as well as accommodating the thickness of the inner aligner. The process to create the 3D solid model includes the following:

1) For each of the patient's teeth, based on the tooth's next position, create a next position 3D tooth model.

2) Offset the next position 3D tooth model's surface by the inner aligner's thickness to create an offset 3D tooth model.

3) For each of the patient's teeth, based on the tooth's current position, create a current 3D tooth model.

4) For each of the patient's teeth, create a 0-N intermediate position(s). Based on the intermediate position(s), create a 0-N intermediate 3D model(s).

5) Through applying union Boolean operation on the offset 3D tooth model, current 3D tooth model and 0-N intermediate 3D tooth model(s), create a combined tooth 3D model.

6) Through applying the union Boolean operation on all the teeth (on a jaw) combined 3D models and the jaw's gingival model, create a jaw mold's 3D model, which is used for forming an outer aligner.

In the process described above, the current tooth position and the next tooth position are used to create an outer aligner's mold model. Between the current tooth position and the next tooth position, one more intermediate tooth positions may be added to create intermediate 3D tooth models. To create combined tooth 3D models, the union Boolean operation is applied to an offset tooth model, to a current tooth model and to an intermediate tooth model(s). By introducing the intermediate tooth model(s), the tooth movement is more guided from its current position to the next position and the aligner surface has smoother transitions.

Figure 6:
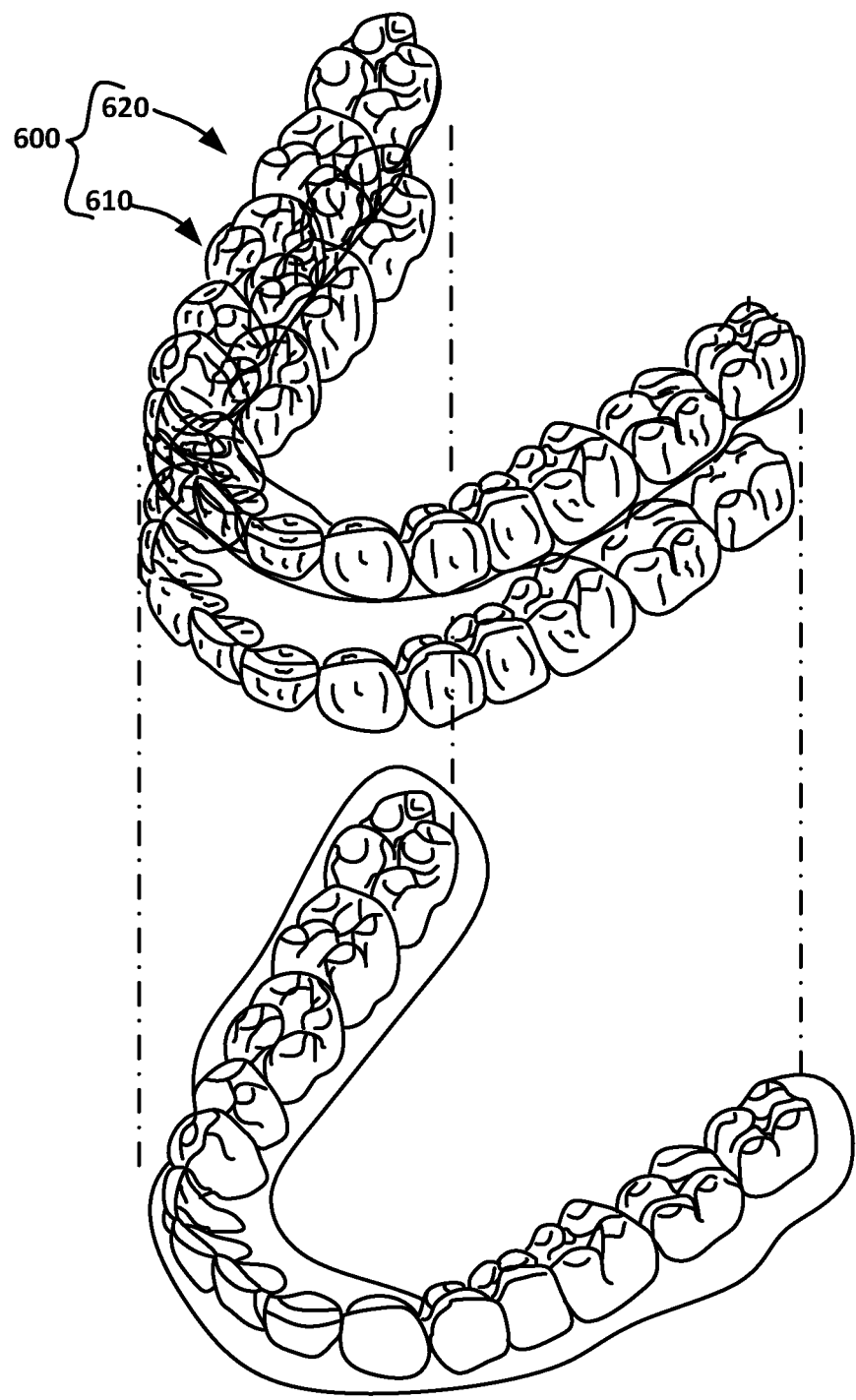
FIG. 6 illustrates an example jaw, which is variously depicted in FIGS. 1A, 5A and 5B, together with an dual aligner assembly which has been configured in accordance with an embodiment.

Referring now to FIG. 6, a dual aligner system 600 according to an embodiment of the present technology is illustrated. The description of various embodiments shown in FIGS. 1A-5B may be incorporated into the structure of the dual aligner system 600 shown in FIG. 6. As seen, the dual aligner system 600 includes an inner aligner 610 and an outer aligner 620. In one embodiment, the dual aligner system 600 is intended to effect incremental repositioning of individual teeth in the jaw as described generally above. The dual aligner system 600, in one embodiment, includes a plurality of aligners (one or more inner aligners and an outer aligner), each having a polymeric shell having cavities shaped to receive and resiliently reposition teeth from one tooth arrangement to a successive tooth arrangement. The polymeric shells, in one embodiment, will fit over all the teeth present in the upper or lower jaw. Often, only certain one(s) of the teeth will be repositioned while an aligner positioned exterior to an inner aligner provides a base or anchor region for holding the inner aligner in place as it applies a resilient repositioning force against the set of target teeth to be positioned at a set of target tooth positions.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What we claim is:

1. A multi-aligner assembly comprising:
   a plurality of aligners, wherein said plurality of aligners comprises:
      a first aligner comprising a first material having a first rigidity, the first aligner further comprising tooth cavities having a first shape corresponding to a set of target tooth positions, wherein the first aligner applies a first orthodontic force against a set of at least three adjacent target teeth of a plurality of teeth of a dental arch of a patient, wherein said first orthodontic force generates movement of said set of at least three adjacent target teeth from a set of current tooth positions toward said set of target tooth positions through a desired treatment movement pathway; and
      a second aligner comprising a second material having a second rigidity greater than said first rigidity, said second aligner configured to at least partially enclose the first aligner and envelope said set of at least three adjacent target teeth in said set of current tooth positions, said set of target tooth positions, or a set of planned positions representing planned treatment movement to achieve said set of target tooth positions from said set of current tooth positions, wherein said second aligner is configured to anchor at least a portion of the first aligner, wherein via said anchoring, a combination of the first aligner and said second aligner create one or more controlled forces to move said set of at least three adjacent target teeth toward said set of target tooth positions through said desired treatment movement pathway and the first aligner comprises a first force enlargement element extending outwards and away from a cavity corresponding to an inner tooth between outer teeth of said set of at least three adjacent target teeth, such that when the multi-aligner assembly is snapped over the plurality of teeth and said second aligner is snapped over the first aligner, said second aligner contacts and presses against the first force enlargement element and thereby is configured to increase said first orthodontic force against the inner tooth of said set of at least three adjacent target teeth.

2. The multi-aligner assembly of claim 1, wherein said desired treatment movement pathway excludes unwanted tooth positions other than: said set of current tooth positions of said set of at least three adjacent target teeth; one or more tooth positions that represent movement of at least one tooth of said set of at least three adjacent target teeth to said set of target tooth positions; and said set of target tooth positions.

3. The multi-aligner assembly of claim 1, wherein the first aligner comprises a first thickness and said second aligner comprises a second thickness greater than said first thickness.

4. The multi-aligner assembly of claim 1, wherein the first aligner comprises an inner aligner and said second aligner comprises an outer aligner, wherein said outer aligner partially encloses said inner aligner.

5. The multi-aligner assembly of claim 1, wherein the multi-aligner assembly comprises a gap between the first aligner and said second aligner, the first force enlargement element extending into said gap, and the first force enlargement element further comprising: a contact region between the first aligner and said second aligner, wherein the contact region provides an anchor point at said second aligner and for the first aligner, the anchor point configured to implement said anchor and to increase said first orthodontic force against at least one tooth of said set of at least three adjacent target teeth.

6. The multi-aligner assembly of claim 5, wherein the first force enlargement element comprises one or more of: a dimple, a ridge, and an outward protrusion.

7. The multi-aligner assembly of claim 1, further comprising:
a second force enlargement element extending into a gap between the first aligner and said second aligner, and wherein a second gap provides an area into which a movement of at least one tooth of said set of at least three adjacent target teeth to at least one target tooth position of said set of target tooth positions is accomplished.

8. The multi-aligner assembly of claim 1, wherein the first force enlargement element comprises one or more of: a dimple and a ridge.

9. A multi-aligner assembly comprising:
a first aligner having a first rigidity, the first aligner comprising tooth cavities having a first shape corresponding to a set of target tooth positions, wherein the first aligner applies a first orthodontic force against a set of at least three adjacent target teeth of a plurality of teeth of a dental arch of a patient, wherein said first orthodontic force generates movement of said set of at least three adjacent target teeth from a set of current tooth positions toward said set of target tooth positions through a desired treatment movement pathway;
a second aligner having a second rigidity greater than said first rigidity, said second aligner configured to at least partially enclose the first aligner and envelope said set of at least three adjacent target teeth in said set of current tooth positions, said set of target tooth positions, or a set of planned positions representing planned treatment movement to achieve said set of target tooth positions from said set of current tooth positions, wherein said second aligner is configured to anchor at least a portion of the first aligner, wherein via said anchoring, a combination of the first aligner and said second aligner create one or more controlled forces to move said set of at least three adjacent target teeth toward said set of target tooth positions through the desired treatment movement pathway and the first aligner comprises a first force enlargement element extending outwards and away from a cavity corresponding to an inner tooth between outer teeth of said set of at least three adjacent target teeth, such that when the multi-aligner assembly is snapped over the plurality of teeth and said second aligner is snapped over the first aligner, said second aligner contacts and presses against the first force enlargement element and thereby is configured to increase said first orthodontic force against the inner tooth of said set of at least three adjacent target teeth.

10. The multi-aligner assembly of claim 9, wherein the first aligner comprises a first thickness and said second aligner comprises a second thickness greater than said first thickness.

11. The multi-aligner assembly of claim 9, wherein the first aligner comprises an inner aligner and said second aligner comprises an outer aligner at least partially enclosing said inner aligner.

12. The multi-aligner assembly of claim 9, wherein the first force enlargement element comprising one or more of: a dimple, a ridge, and an outward protrusion.

13. A multi-aligner assembly comprising:
a first aligner having a first rigidity, the first aligner further comprising tooth cavities having a first shape corresponding to a set of target tooth positions, wherein the first aligner applies a first orthodontic force against a set of at least three adjacent target teeth of a plurality of teeth of a dental arch of a patient, wherein said first orthodontic force generates movement of said set of at least three adjacent target teeth from a set of current tooth positions toward said set of target tooth positions through a desired treatment movement pathway; and
a second aligner having a second rigidity greater than said first rigidity, said second aligner configured to at least partially enclose the first aligner and envelope said set of at least three adjacent target teeth in said set of current tooth positions, said set of at least three adjacent target teeth in said set of target tooth positions, and said set of at least three adjacent target teeth in a set of planned positions representing planned treatment movement to achieve said set of target tooth positions from said set of current tooth positions, wherein said second aligner comprises means for anchoring at least a portion of the first aligner, wherein via said means for anchoring, a combination of the first aligner and said second aligner create one or more controlled forces to move said set of at least three adjacent target teeth toward said set of target tooth positions through said desired treatment movement pathway and the first aligner comprises a first force enlargement element extending outwards and away from a cavity corresponding to an inner tooth between outer teeth of said set of at least three adjacent target teeth, such that when the multi-aligner assembly is snapped over the plurality of teeth and said second aligner is snapped over the first aligner, said second aligner contacts and presses against the first force enlargement element and thereby is configured to increase said first orthodontic force against the inner tooth of said set of at least three adjacent teeth.

14. The multi-aligner assembly of claim 1, wherein said one or more controlled forces apply pressure against a gingival line of said set of at least three adjacent target teeth.

15. The multi-aligner assembly of claim 1, wherein said one or more controlled forces cause an inner surface of the first aligner to press against said set of at least three adjacent target teeth at one or more positions corresponding to the first force enlargement element on the first aligner.

16. The multi-aligner assembly of claim 1, wherein said one or more controlled forces cause the first aligner to push against said set of at least three adjacent target teeth in a tangent direction relative to said set of at least three adjacent target teeth, thereby creating a rotation torque on said set of at least three adjacent target teeth.

17. The multi-layer assembly of claim 1, wherein said one or more controlled forces provide tooth movement guidance to the first aligner to guide movement of said set of at least three adjacent target teeth along said desired treatment movement pathway.

* * * * *